US012687710B2

(12) United States Patent　　　　(10) Patent No.:　US 12,687,710 B2
Suzuki et al.　　　　　　　　　　　(45) Date of Patent:　Jul. 21, 2026

(54) CONCENTRATING LENS, PHOTODETECTOR WITH CONCENTRATING LENS, CONCENTRATING LENS UNIT

(71) Applicants:HAMAMATSU PHOTONICS K.K., Hamamatsu (JP); Vrije Universiteit Brussel, Brussels (BE)

(72) Inventors: Tomohiko Suzuki, Hamamatsu (JP); Suguru Matsumoto, Hamamatsu (JP); Hirokazu Muramatsu, Hamamatsu (JP); Yunfeng Nie, Brussels (BE); Heidi Ottevaere, Brussels (BE); Hugo Thienpont, Brussels (BE)

(73) Assignees: HAMAMATSU PHOTONICS K.K., Hamamatsu (JP); Vrije Universiteit Brussel, Brussels (BE)

( * ) Notice: Subject to any disclaimer, the term of this patent is extended or adjusted under 35 U.S.C. 154(b) by 261 days.

(21) Appl. No.: 18/236,054

(22) Filed: Aug. 21, 2023

(65) Prior Publication Data

US 2024/0069314 A1　　Feb. 29, 2024

(30) Foreign Application Priority Data

Aug. 23, 2022　(EP) .................................... 22191693

(51) Int. Cl.
G02B 19/00　　　　(2006.01)
(52) U.S. Cl.
CPC ............................... G02B 19/0076 (2013.01)
(58) Field of Classification Search
None
See application file for complete search history.

(56) References Cited

U.S. PATENT DOCUMENTS 6,547,423　B2　　4/2003　Marshall et al.
7,083,313　B2　　8/2006　Smith
　　　　　　　　(Continued)

FOREIGN PATENT DOCUMENTS

EP　　　　1235281　A1　　8/2002
EP　　　　2557589　A1　　2/2013
　　　　　　　　(Continued)

OTHER PUBLICATIONS

Dejan Grabovičkić et al., "TIR RXI collimator", Optical Society of America, vol. 20, No. S1, Optics Express, Dec. 6, 2011, p. A51-p. A61.

(Continued)

*Primary Examiner* — Robert E. Tallman
(74) *Attorney, Agent, or Firm* — Faegre Drinker Biddle & Reath LLP

(57) ABSTRACT

A concentrating lens includes an incident surface, an emitting surface, and a reflective surface. The incident surface includes a central portion and an outer portion. The incident surface is formed by an inner surface of a depression portion. The reflective surface surrounds the emitting surface. The reflective surface extends so as to go toward a first side as going toward an outside. A first light incident on the outer portion of the incident surface transmits through the outer portion, is reflected by the reflective surface, reflected by the incident surface, and incident on the emitting surface. A second light incident on the central portion of the incident surface transmits through the central portion and is incident on the emitting surface. The central portion of the incident surface reflects the first light reflected by the reflective surface, toward the emitting surface and transmits the second light.

18 Claims, 21 Drawing Sheets

(56)        References Cited

U.S. PATENT DOCUMENTS

| | | | |
|---|---|---|---|
| 2004/0070855 A1* | 4/2004 | Benitez .............. | G02B 19/0061 |
| | | | 359/858 |
| 2007/0159847 A1 | 7/2007 | Li | |
| 2011/0026130 A1* | 2/2011 | Winston ............... | G02B 19/008 |
| | | | 359/857 |
| 2015/0140263 A1 | 5/2015 | Ohno et al. | |

FOREIGN PATENT DOCUMENTS

| | | |
|---|---|---|
| EP | 2827179 A2 | 1/2015 |
| JP | H10-221528 A | 8/1998 |
| JP | 2013-134985 A | 7/2013 |
| JP | 2014-003168 A | 1/2014 |
| JP | 2018-504637 A | 2/2018 |
| WO | WO-2016/118643 A1 | 7/2016 |

OTHER PUBLICATIONS

Jiayao Liu et al, "Design and Development of Compact Optical Systems", Polytechnic University of Madrid, 2015, p. 1-p. 152.
Buljan, M. et al., "Improving Performances of Fresnel CPV System: Fresnel-RXI Köhler Concentrator," 25th European Photovoltaic Solar Energy Conference and Exhibition / 5th World Conference on Photovoltaic Energy Conversion, Sep. 6-10, 2010, pp. 930-936.
Okamoto, K. et al., "Optical and thermal analysis of a solar concentrator for CPV modules based on LED package technology," Proceedings of the 23rd International Photovoltaic Science and Engineering Conference (PVSEC-23), Oct. 28-Nov. 1, 2013.
Noboru Yamada et al., "Development of silicone-encapsulated CPV module based on LED package technology", IEEE 39th Photovoltaic Specialists Conference (PVSC), Jun. 16, 2013 p. 493-p. 496.
European Notice of Allowance issued Jun. 2, 2026 in Application No. 22191693.5.

* cited by examiner

CONCENTRATING LENS, PHOTODETECTOR WITH CONCENTRATING LENS, CONCENTRATING LENS UNIT

TECHNICAL FIELD

An aspect of the present disclosure relates to a concentrating lens, a photodetector with a concentrating lens, and a concentrating lens unit.

BACKGROUND

For example, in order to cause light coming from a light source to be efficiently incident on a light-receiving surface of a photodetector, a concentrating lens may be disposed on the light-receiving surface, and the light may be concentrated by the concentrating lens. On the other hand, non-patent literature "K. Okamoto, N. Yamada, Optical and thermal analysis of a solar concentrator for CPV modules based on LED package technology, Proceedings of the 23rd International Photovoltaic Science and Engineering Conference (PVSEC-23), Taiwan (28, Oct.-1, Nov. 2013), 4-P-42." discloses a solar RXI concentrator using refraction, reflection, and total reflection.

When a shape of the RXI concentrator described in the above non-patent literature is adopted as a shape of a concentrating lens, the concentrating lens can be reduced in thickness. On the other hand, the concentrating lens requires an increase in concentration efficiency. Normally, a bulky optical system is needed to increase the concentration efficiency, particularly, an increase in length in an optical axis direction is required, which contradicts a reduction in thickness.

SUMMARY

An objective of an aspect of the present disclosure is to provide a concentrating lens, a photodetector with a concentrating lens, and a concentrating lens unit capable of achieving a reduction in thickness and high efficiency.

According to an aspect of the present disclosure, there is provided a concentrating lens that concentrates light incident along an optical axis direction and emits the light, the lens including: an incident surface that is a surface on a first side in the optical axis direction; and an emitting surface and a reflective surface that are surfaces on a second side in the optical axis direction. The incident surface includes a central portion and an outer portion surrounding the central portion when viewed in the optical axis direction. The incident surface is formed by an inner surface of a depression portion recessed toward a center of the central portion. The reflective surface surrounds the emitting surface when viewed in the optical axis direction. The reflective surface extends so as to go toward the first side as the reflective surface as going toward an outside. A first light incident on the outer portion of the incident surface transmits through the outer portion, is reflected by the reflective surface, reflected by the incident surface again, and then incident on the emitting surface. A second light incident on the central portion of the incident surface transmits through the central portion and is incident on the emitting surface. The central portion also reflects the first light reflected by the reflective surface, toward the emitting surface and transmits the second light.

In the concentrating lens, the first light incident on the outer portion of the incident surface transmits through the outer portion, is reflected by the reflective surface, reflected by the incident surface, and incident on the emitting surface. On the other hand, the second light incident on the central portion of the incident surface transmits through the central portion and is incident on the emitting surface. The central portion reflects the first light reflected by the reflective surface, toward the emitting surface and transmits the second light. Namely, the central portion functions as a reflective surface that reflects the first light reflected by the reflective surface, toward the emitting surface, and also functions as a transmitting surface that transmits (refracts) the second light. In the concentrating lens, there exist optical paths of two systems, namely, a first system through which the first light travels and a second system through which the second light travels, and two optical paths of the first system and the second system spatially overlap each other. Accordingly, it is possible to achieve a reduction in thickness and high efficiency.

The emitting surface may be a flat surface perpendicular to the optical axis direction. In this case, for example, the emitting surface can be suitably disposed on a light-receiving surface of a photodetector or on a window member.

The emitting surface may be formed by an inner surface of a depression portion recessed toward a center of the emitting surface. In this case, it is possible to suppress the total reflection of the light that has travelled through the concentrating lens and been incident on the emitting surface.

The emitting surface may be curved to be recessed toward the center of the emitting surface. In this case, it is possible to suppress the total reflection of the light that has travelled through the concentrating lens and been incident on the emitting surface.

When a region on the incident surface is defined as a non-effective region, light incident on the region in parallel to the optical axis direction not being incident on the emitting surface, the non-effective region may be set on the incident surface such that a concentration efficiency of the concentrating lens for the light parallel to the optical axis direction is 50% or more. In this case, since the incident surface includes the non-effective region, it is possible to widen the incident surface. In addition, it is possible to set the concentration efficiency to 50% or more while widening the incident surface.

When a region on the incident surface is defined as a non-effective region, light incident on the region in parallel to the optical axis direction not being incident on the emitting surface, the non-effective region may be set on the incident surface such that an area of the non-effective region is 50% or less of an entire area of the incident surface. In this case, since the incident surface includes the non-effective region, it is possible to widen the incident surface. In addition, since the area of the non-effective region is 50% or less of the entire area of the incident surface, it is possible to increase the concentration efficiency while widening the incident surface.

When a region on the incident surface is defined as a non-effective region, light incident on the region in parallel to the optical axis direction not being incident on the emitting surface, the incident surface may not include the non-effective region. In this case, it is possible to achieve a reduction in size by narrowing the incident surface, and it is possible to increase the concentration efficiency.

In a cross section perpendicular to the optical axis direction, the incident surface may include a pair of parts facing each other, and each of the pair of parts may be curved to swell toward the first side. In this case, it is possible to suitably realize the two optical paths of the first system and the second system.

In a cross section perpendicular to the optical axis direction, the reflective surface may include a first part and a second part located on the first side with respect to the first part, the first part may be curved to swell toward the second side, and the second part may be curved to be recessed toward the first side. In this case, the first light incident on the reflective surface can be suitably reflected toward the incident surface.

A reflective layer may be formed on the reflective surface, so that the reflective surface reflects the light. In this case, the first light incident on the reflective surface can be suitably reflected.

An anti-reflection layer may be formed on the incident surface, so that the incident surface prevents the light from being reflected. In this case, incident light suitably transmits through the incident surface.

A photodetector with a concentrating lens according to an aspect of the present disclosure includes: a photodetection unit having a light-receiving surface; and the concentrating lens in which the emitting surface is disposed to face the light-receiving surface. According to the photodetector with a concentrating lens, for the above-described reason, it is possible to achieve a reduction in thickness and high efficiency.

The emitting surface and the light-receiving surface may be connected to each other via an optical coupling agent. In this case, it is possible to suppress the total reflection of the light that has travelled through the concentrating lens and been incident on the emitting surface.

A concentrating lens unit according to an aspect of the present disclosure includes: the concentrating lens; and a reflective member combined with the concentrating lens. The reflective member has a reflective surface that reflects light, and the reflective surface of the reflective member is disposed along the reflective surface of the concentrating lens, so that the reflective surface of the concentrating lens reflects the light. According to the concentrating lens unit, for the above-described reason, it is possible to achieve a reduction in thickness and high efficiency. Since the reflective member is combined with the concentrating lens, it is possible to improve the strength.

According to an aspect of the present disclosure, it is possible to provide the concentrating lens, the photodetector with a concentrating lens, and the concentrating lens unit capable of achieving a reduction in thickness and high efficiency.

DETAILED DESCRIPTION

Hereinafter, an embodiment of the present disclosure will be described in detail with reference to the drawings. In the following description, the same reference signs are used for the same or equivalent elements, and duplicated descriptions will be omitted.

Figure 1:
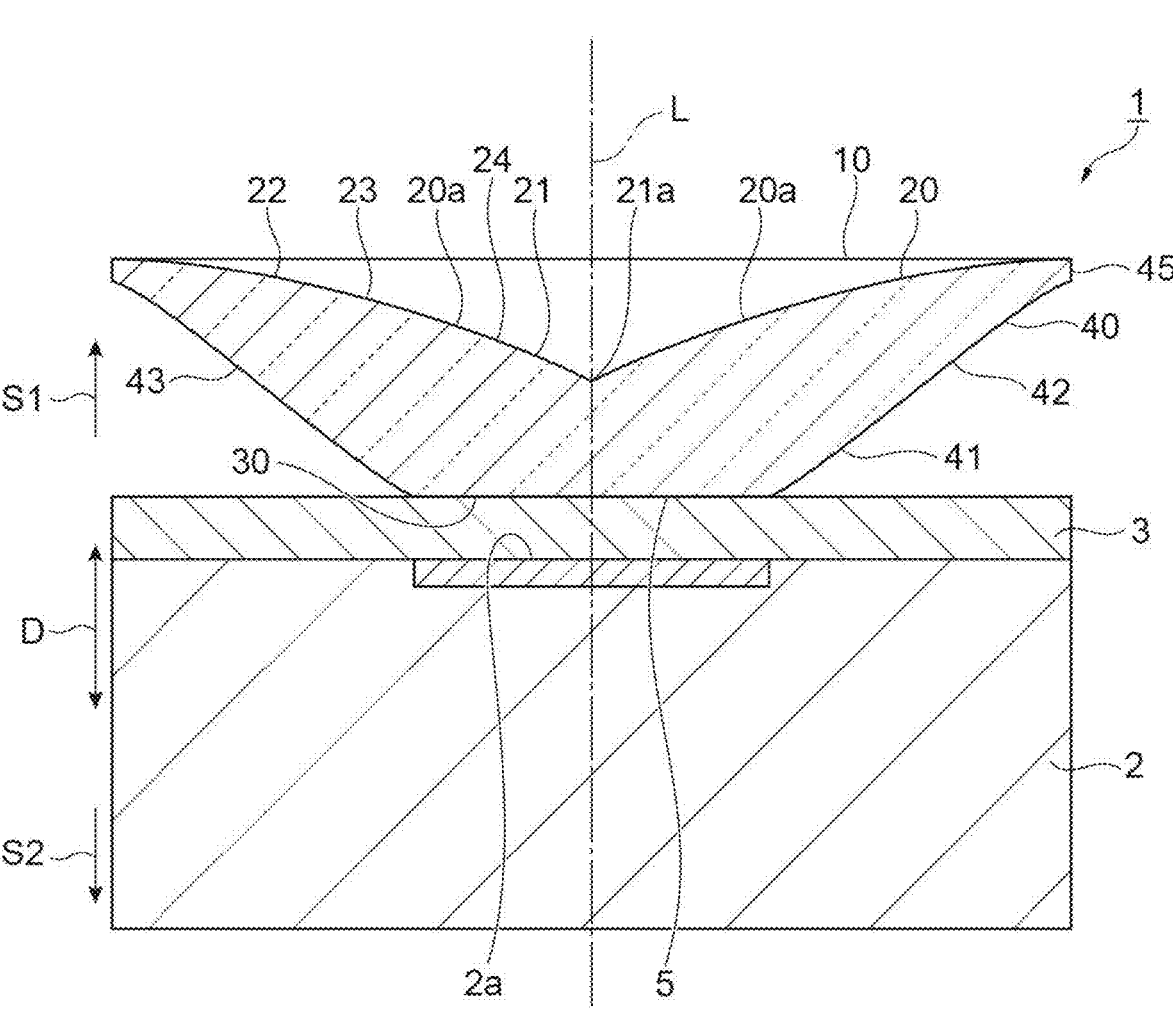
FIG. 1 is a cross-sectional view of a photodetector with a concentrating lens according to an embodiment.

As illustrated in FIG. 1, a photodetector 1 with a concentrating lens (hereinafter, simply referred to as the photodetector 1 as well) includes a photodetection unit 2 and a concentrating lens 10. In this example, the photodetection unit 2 is a photomultiplier tube (PMT) formed in a substantially rectangular parallelepiped shape, and has a light-receiving surface 2a that is a photoelectric surface on an inner surface of a window member 3 having light transmissivity. In the photomultiplier tube, photoelectrons released by the incidence of light on the light-receiving surface 2a are amplified and detected. Alternatively, the photodetection unit 2 may be configured to include a solid-state element formed of a semiconductor. The concentrating lens 10 is disposed on an outer surface on the window member 3 to face the light-receiving surface 2a via the window member 3.

The concentrating lens 10 is a concentrating lens for concentrating light incident along an optical axis direction D and emitting the light. The optical axis direction D is a direction parallel to an optical axis L of the concentrating lens 10. The concentrating lens 10 is formed from, for example, a light-transmitting material such as glass except for a reflective layer 43 to be described later. The light-transmitting material can be selected such that the refractive index of the concentrating lens 10 is 1.48 or more, preferably 1.8 or more. In this example, the concentrating lens 10 is formed in a substantially flat truncated cone shape.

Figure 2:
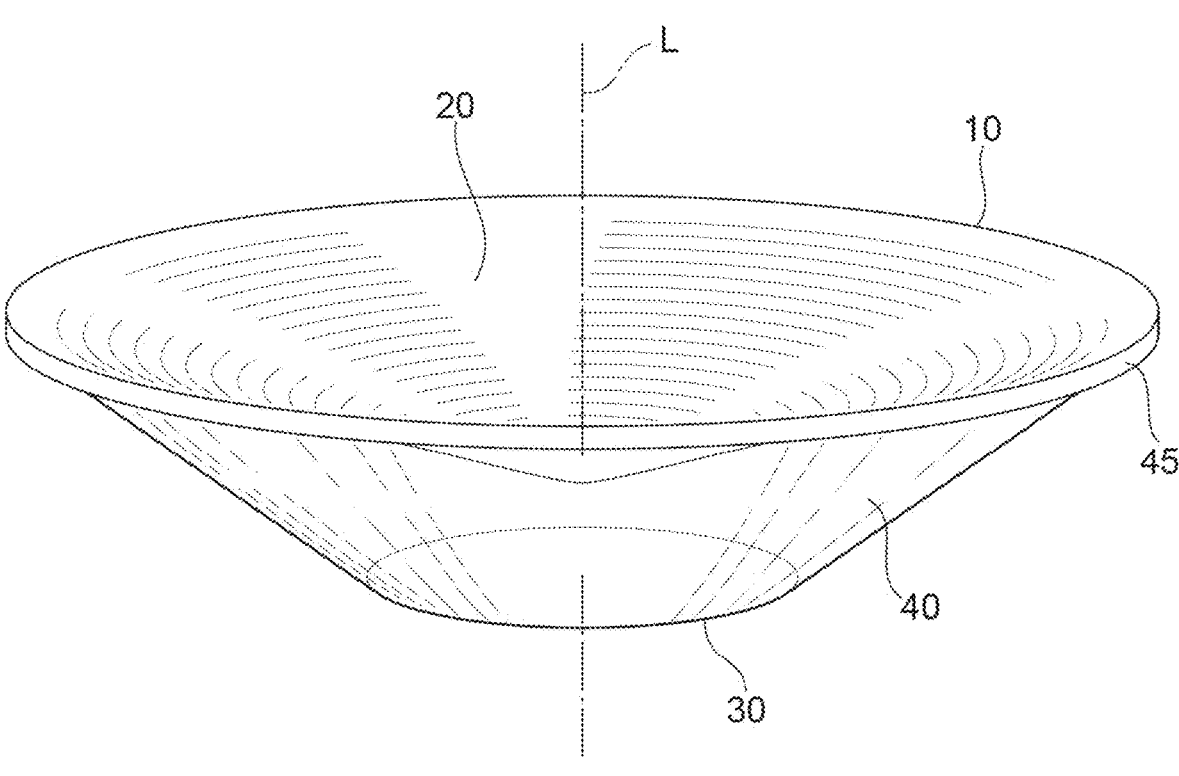
FIG. 2 is a perspective view of the concentrating lens according to the embodiment.

As illustrated in FIGS. 1 and 2, the concentrating lens 10 includes an incident surface 20, an emitting surface 30, a reflective surface 40, and a side surface 45. The incident surface 20 is a surface on a first side S1 in the optical axis direction D, and the emitting surface 30 and the reflective surface 40 are surfaces on a second side S2 in the optical axis direction D. The second side S2 is opposite to the first side S1. In FIGS. 1 and 2, the first side S1 is an upper side in the drawings, and the second side S2 is a lower side in the drawings.

Light is incident on the incident surface 20 from the first side S1 in the optical axis direction D. The incident surface 20 faces the first side S1 in the optical axis direction D. The incident surface 20 includes a central portion 21 and an outer portion 22 surrounding the central portion 21 when viewed in the optical axis direction D. The central portion 21 is, for example, a region located on the optical axis L and having a circular shape when viewed in the optical axis direction D. The outer portion 22 is, for example, a region forming an outer edge portion (outer peripheral portion) of the incident surface 20 and having an annular shape surrounding the central portion 21 when viewed in the optical axis direction D.

The incident surface 20 is formed by an inner surface of a depression portion (concave portion) 23 recessed toward a center 21a of the central portion 21. In this example, the depression portion 23 is formed in a substantially conical shape tapered toward the center 21a. The incident surface 20 includes a pair of parts 20a facing each other in a cross section perpendicular to the optical axis direction D (for example, a cross section illustrated in FIG. 1). The pair of parts 20a face each other in a direction perpendicular to the optical axis direction D, and are connected to each other at the center 21a of the central portion 21. Each of the parts 20a extends from the center 21a toward the outside in the radial direction (direction perpendicular to the optical axis direction D). Each of the parts 20a extends so as to go toward the first side S1 as going toward the outside. Each of the parts 20a is curved to swell toward the first side S1. Each of the parts 20a is, for example, an arc surface that is curved in an arc shape. In this example, the concentrating lens 10 has a uniform shape in a circumferential direction, and the incident surface has the same shape in any cross section perpendicular to the optical axis direction D.

An anti-reflection layer 24 is formed over the entirety of the incident surface 20. The anti-reflection layer 24 is, for example, an anti-reflection film that is formed on the incident surface 20 by the evaporation of a material such as MgF$_2$ having a desired optical characteristic. The anti-reflection layer 24 prevents incident light from being reflected on the incident surface 20 and thus from not being guided into the concentrating lens 10.

The emitting surface 30 is a surface that emits light which has been incident on the incident surface 20 and concentrated in the concentrating lens 10, and light which has transmitted (refracted) through the concentrating lens 10. The emitting surface 30 is located on the optical axis L and faces the central portion 21 of the incident surface 20 in the optical axis direction D. In this example, the emitting surface 30 is a flat surface perpendicular to the optical axis direction D and is formed in a circular shape. The emitting surface 30 faces the light-receiving surface 2a of the photodetection unit 2 via the window member 3.

An optical coupling agent 5 is disposed between the emitting surface 30 and the window member 3, and the emitting surface 30 and the light-receiving surface 2a are connected to each other via the optical coupling agent 5. The optical coupling agent 5 is formed in a layer shape from, for example, an optical grease and is in contact with the entirety of the emitting surface 30. The optical coupling agent 5 has a refractive index between a refractive index of the concentrating lens 10 and a refractive index of the window member 3.

The reflective surface 40 is a surface that reflects light which has travelled through the concentrating lens 10 and been incident on the reflective surface 40. The reflective surface 40 surrounds the emitting surface 30 when viewed in the optical axis direction D. In this example, the reflective surface 40 is a surface having a substantially truncated cone shape, and has an annular shape when viewed in the optical axis direction D. The reflective surface 40 faces the outer portion 22 of the incident surface 20 in the optical axis direction D.

The reflective surface 40 extends from an outer edge of the emitting surface 30 toward the outside in the radial direction. The reflective surface 40 extends so as to go toward the first side S1 as going toward the outside. The reflective surface 40 includes a first part 41 and a second part 42 located on the first side S1 with respect to the first part 41. The first part 41 is curved to swell toward the second side S2. The second part 42 is curved to be recessed toward the first side S1. Namely, the reflective surface 40 is curved in a substantially S shape in a cross section perpendicular to the optical axis direction D.

The reflective layer 43 is formed over the entirety of the reflective surface 40. The reflective layer 43 is, for example, a reflective film that is formed on the reflective surface 40 by the evaporation of a metal material such as aluminum. The reflective layer 43 is formed on the reflective surface 40, so that the reflective surface 40 reflects light. In this example, an outer edge of the reflective surface 40 and an outer edge of the incident surface 20 are connected to each other by the side surface 45. The side surface 45 is a cylindrical surface having the optical axis L as a center line.

Optical paths along which light travels through the concentrating lens 10 will be described with reference to FIGS. 3A to 5C. In the concentrating lens 10, there exist optical paths of two systems, namely, a first system and a second system. The first system is an optical path along which a first light L1 incident on the outer portion 22 of the incident surface 20 travels to the emitting surface 30, and the second system is an optical path along which a second light L2 incident on the central portion 21 of the incident surface 20 travels to the emitting surface 30. In the concentrating lens 10, two optical paths of the first system and the second system spatially overlap each other, so that a reduction in the thickness of and high efficiency of the concentrating lens 10 are achieved.

Figure 3A:
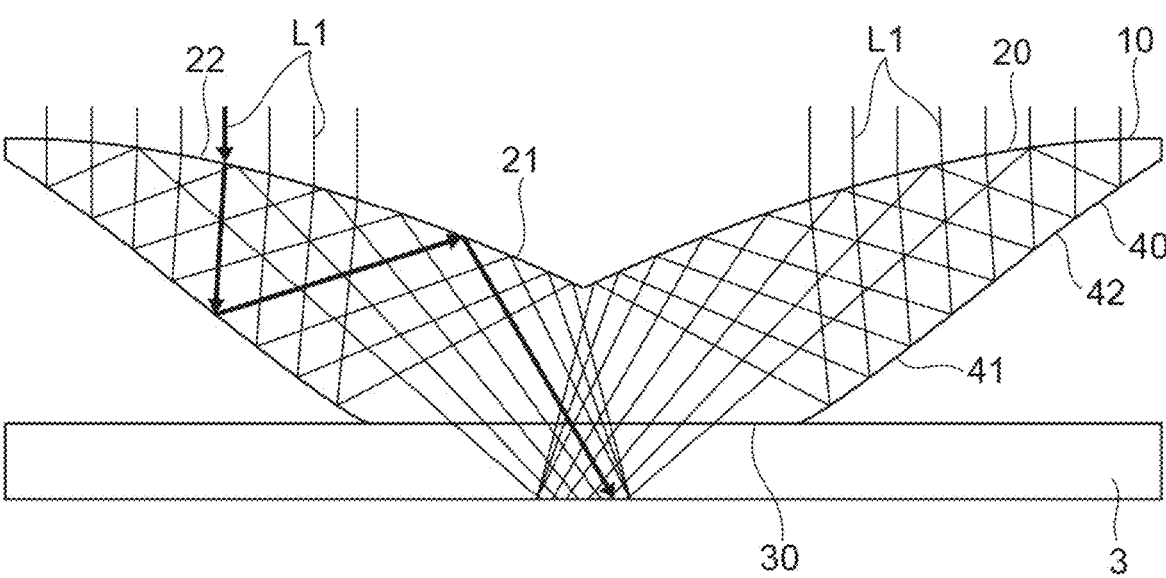
FIG. 3A is a view for describing a first system.
Figure 3B:
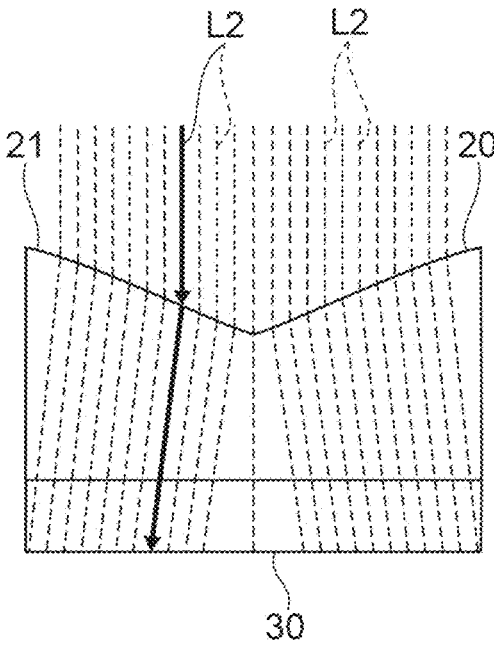
FIG. 3B is a view for describing a second system.
Figure 4:
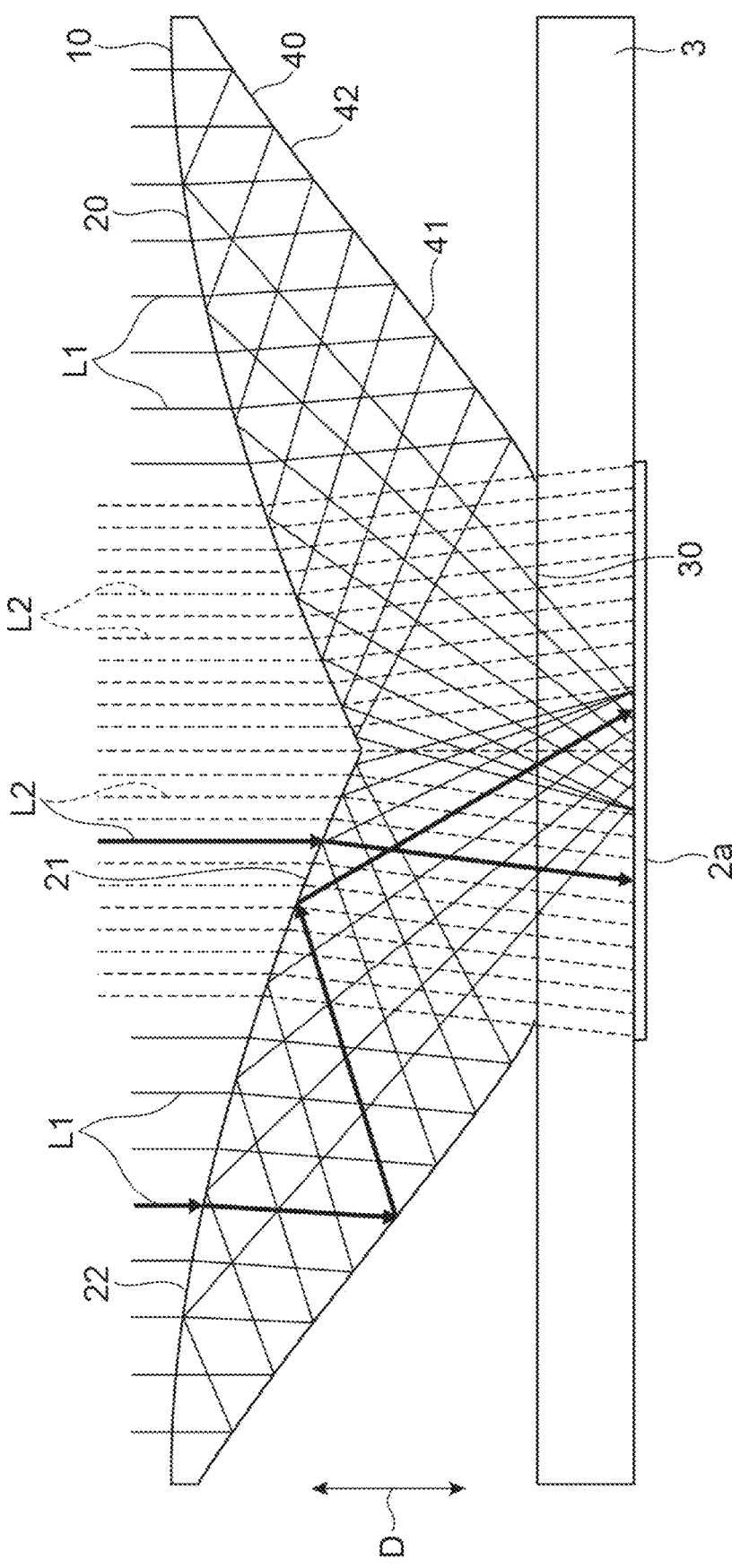
FIG. 4 is a view for describing two optical paths in the concentrating lens.

FIG. 3A is a view for describing the first system, and FIG. 3B is a view for describing the second system. In FIG. 3B, the outer portion 22 of the incident surface 20 is omitted. FIG. 4 illustrates both optical paths of the first system and the second system. FIGS. 3A, 3B, and 4 illustrate an optical path example when light is incident on the incident surface 20 in parallel to the optical axis direction D.

As illustrated in FIG. 3A, the first light L1 incident on the outer portion 22 transmits through the outer portion 22 and is reflected by the reflective surface 40. When the first light L1 transmits through the outer portion 22, the first light L1 is refracted. Depending on the position of incidence on the outer portion 22, the first light L1 is reflected by either of the first part 41 and the second part 42 of the reflective surface 40. In this example, the first light L1 that has transmitted through an inner part of the outer portion 22 is reflected by the first part 41, and the first light L1 that has transmitted through an outer part of the outer portion 22 is reflected by the second part 42. Subsequently, the first light L1 is reflected by the incident surface 20 and is incident on the emitting surface 30. The reflection of the first light L1 on the incident surface 20 is total reflection. Depending on the position of incidence on the outer portion 22, the first light L1 is reflected by either of the central portion 21 and the outer portion 22 of the incident surface 20. Thereafter, the first light L1 transmits through the emitting surface 30, is emitted from the emitting surface 30, transmits through the window member 3, and then is incident on the light-receiving surface 2a of the photodetection unit 2.

As illustrated in FIG. 3B, the second light L2 incident on the central portion 21 of the incident surface 20 transmits through the central portion 21 and is incident on the emitting surface 30. When the second light L2 transmits through the central portion 21, the second light L2 is refracted. Thereafter, the second light L2 transmits through the emitting surface 30, is emitted from the emitting surface 30, transmits through the window member 3, and then is incident on the light-receiving surface 2a of the photodetection unit 2. As such, the central portion 21 transmits the second light L2. In addition, as described above, the central portion 21 also function as a reflective surface that reflects the first light L1 reflected by the reflective surface 40, toward the emitting surface 30. Namely, the central portion 21 functions as a reflective surface that reflects the first light L1 reflected by the reflective surface 40, toward the emitting surface 30, and also functions as a transmitting surface that transmits (refracts) the second light L2. For this reason, as illustrated in FIG. 4, in the concentrating lens 10, the two optical paths of the first system and the second system spatially overlap each other. More specifically, both optical paths of the first system and the second system pass through a region overlapping the central portion 21 in the concentrating lens 10 when viewed in the optical axis direction D.

Figure 5A:
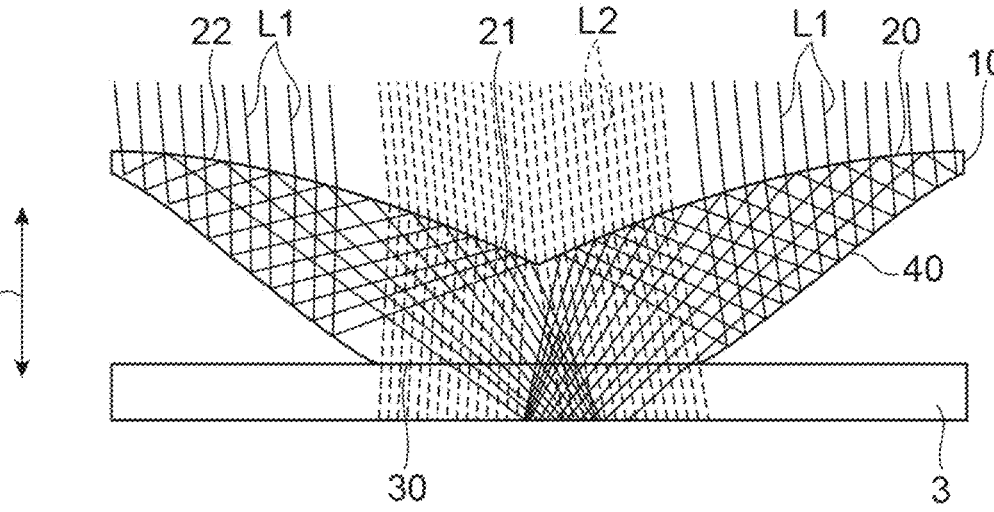
FIGS. 5A, 5B, and 5C are views illustrating optical paths when light is incident at an inclination of 5 degrees, 10 degrees, and 20 degrees with respect to an optical axis direction, respectively.
Figure 5B:
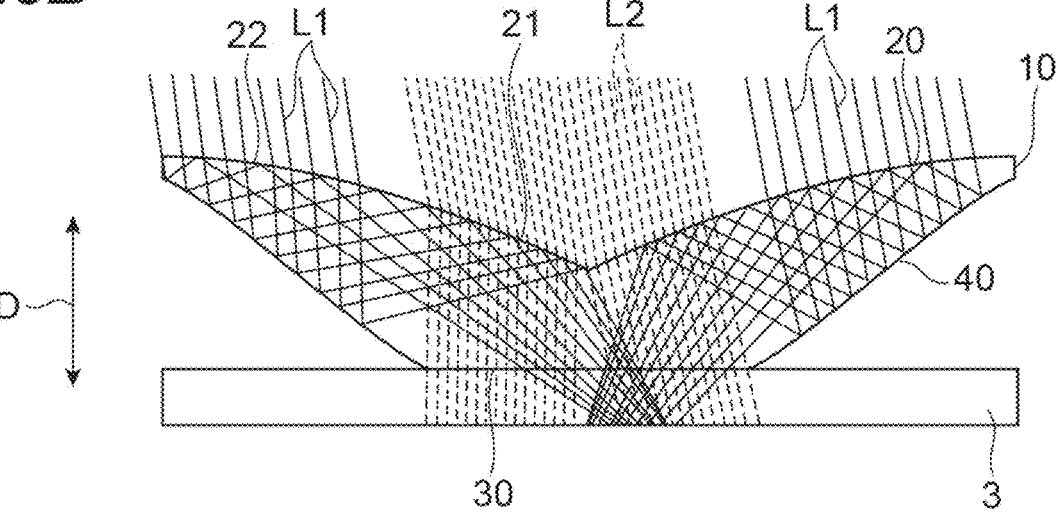
Figure 5C:
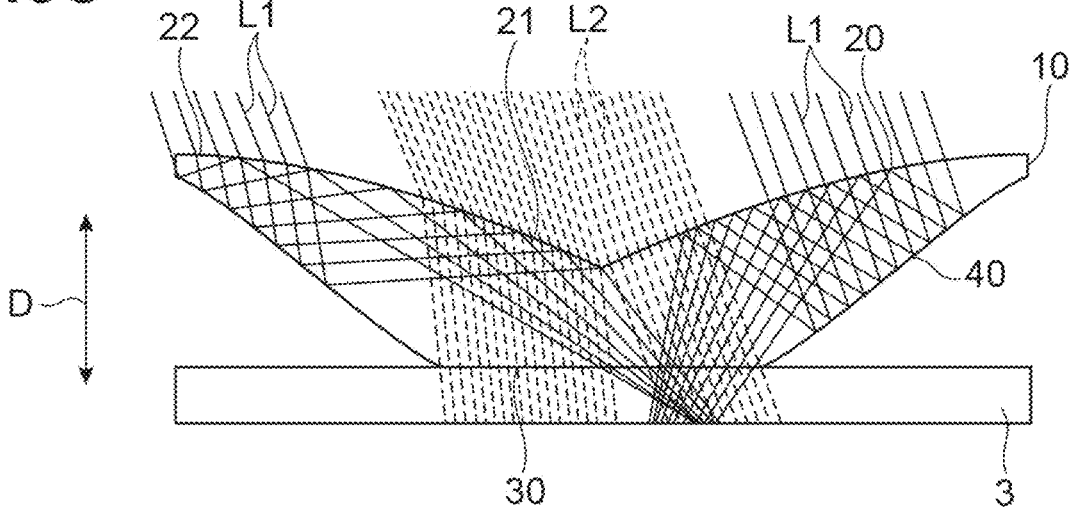

FIGS. 5A, 5B, and 5C are views illustrating optical paths when light is incident on the incident surface 20 at an inclination of 5 degrees, degrees, and 20 degrees with respect to the optical axis direction D, respectively. As illustrated in FIGS. 5A, 5B, and 5C, even when light is incident with an inclination with respect to the optical axis direction D, similarly to when light is incident in parallel to the optical axis direction D, the first light L1 and the second light L2 travel through the concentrating lens 10 and are incident on the emitting surface 30. Also, in this case, two optical paths of the first system and the second system spatially overlap each other. As described above, the concentrating lens is effective in not only concentrating the light incident in parallel to the optical axis direction D but also concentrating the light incident with an inclination with respect to the optical axis direction D. Therefore, the concentrating lens 10 can be suitably used for the concentration of scattered light.

[Functions and Effects]

In the concentrating lens 10, the first light L1 incident on the outer portion 22 of the incident surface 20 transmits through the outer portion 22, is reflected by the reflective surface 40, reflected by the incident surface 20, and incident on the emitting surface 30. On the other hand, the second light L2 incident on the central portion 21 of the incident surface 20 transmits through the central portion 21 and is incident on the emitting surface 30. The central portion 21 reflects the first light L1 reflected by the reflective surface 40, toward the emitting surface 30 and transmits the second light L2. Namely, the central portion 21 functions as a reflective surface that reflects the first light L1 reflected by the reflective surface 40, toward the emitting surface 30, and also functions as a transmitting surface that transmits (refracts) the second light L2. In the concentrating lens 10, there exist the optical paths of the two systems, namely, the first system through which the first light L1 travels and the second system through which the second light L2 travels, and the two optical paths of the first system and the second system spatially overlap each other. Accordingly, it is possible to achieve a reduction in thickness and high efficiency.

The emitting surface 30 is a flat surface perpendicular to the optical axis direction D. Accordingly, for example, the emitting surface can be suitably disposed on the light-receiving surface 2a of the photodetection unit 2 or on the window member 3.

In a cross section perpendicular to the optical axis direction D, the incident surface 20 includes the pair of parts 20a facing each other, and each of the parts 20a is curved to swell toward the first side S1. Accordingly, it is possible to suitably realize the two optical paths of the first system and the second system.

In a cross section perpendicular to the optical axis direction D, the reflective surface 40 includes the first part 41 and the second part 42 located on the first side S1 with respect to the first part 41, the first part 41 is curved to swell toward the second side S2, and the second part 42 is curved to swell toward the first side S1. Accordingly, the first light L1 incident on the reflective surface 40 can be suitably reflected toward the incident surface 20.

The reflective layer 43 is formed on the reflective surface 40, so that the reflective surface 40 reflects light. Accordingly, the first light L1 incident on the reflective surface 40 can be suitably reflected.

The emitting surface 30 and the light-receiving surface 2a of the photodetection unit 2 are connected to each other via the optical coupling agent 5. Accordingly, it is possible to suppress the total reflection of the light that has travelled through the concentrating lens 10 and been incident on the emitting surface 30.

Figure 6:
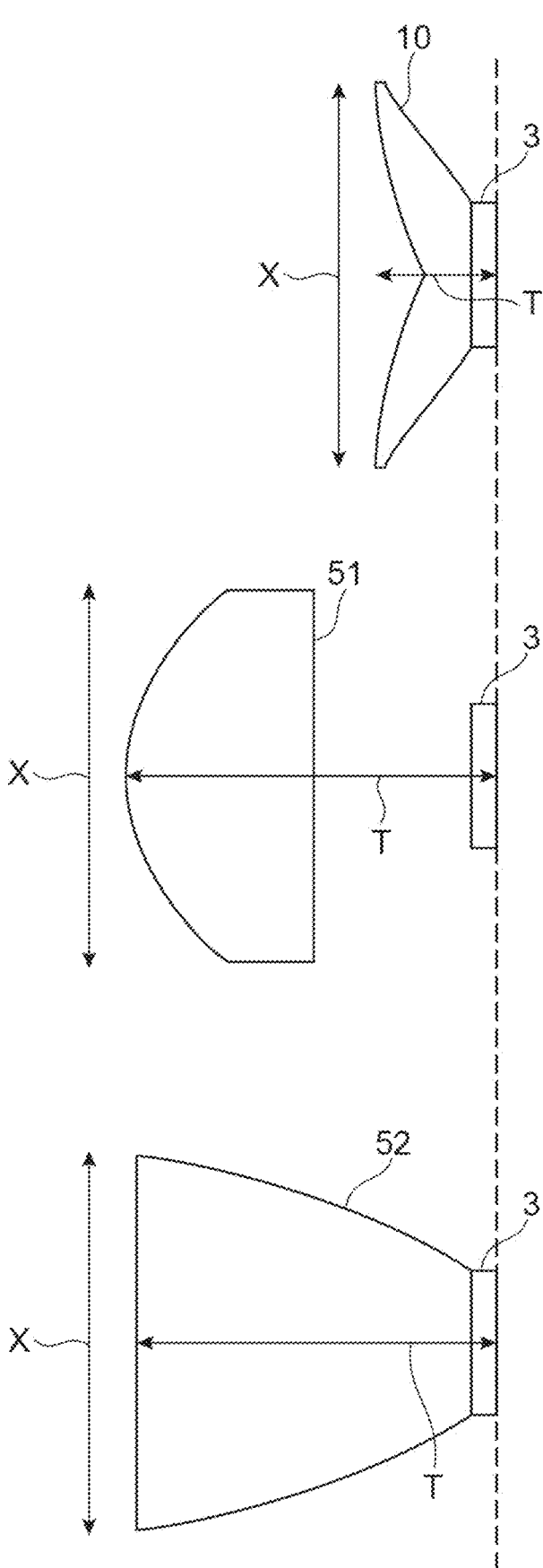
FIG. 6 is a view for describing a first simulation.

Results of a first simulation will be described with reference to FIGS. 6, 7A, and 7B. In the first simulation, the concentrating lens 10 of the embodiment was compared to other lenses with the sizes of incident surfaces of the lenses set to be the same. In this example, an incident diameter X was set to 8 mm, and the size of the light-receiving surface 2a was set to 3 mm×3 mm. Incidentally, all the lenses are optically coupled to the photodetection unit 2, but in FIG. 6, for simplicity of the drawing, only the window member 3 including the light-receiving surface 2a is illustrated, and the position of the light-receiving surface 2a is represented by a dotted line. The concentrating lens 10 is illustrated at a top of FIG. 6. An aspherical single lens 51 of a first comparative example is illustrated at a center of FIG. 6. A hollow compound parabolic concentrator (CPC) 52 of a second comparative example is illustrated at a bottom of FIG. 6. In the concentrating lens 10, a distance T between the light-receiving surface 2a and a tip of the lens was 2.5 mm. The distance T was 7.8 mm in the aspherical single lens 51, and the distance T was 7.8 mm in the CPC 52. The allowable light-receiving angle of the CPC 52 was 19 degrees. As described above, in the concentrating lens 10, the distance T between the light-receiving surface 2a and the front edge of the lens can be sufficiently reduced while having the same incident diameter X when compared to the other lenses. Namely, the distance required for the concentration of light can be reduced when compared to the other lenses.

Figure 7A:
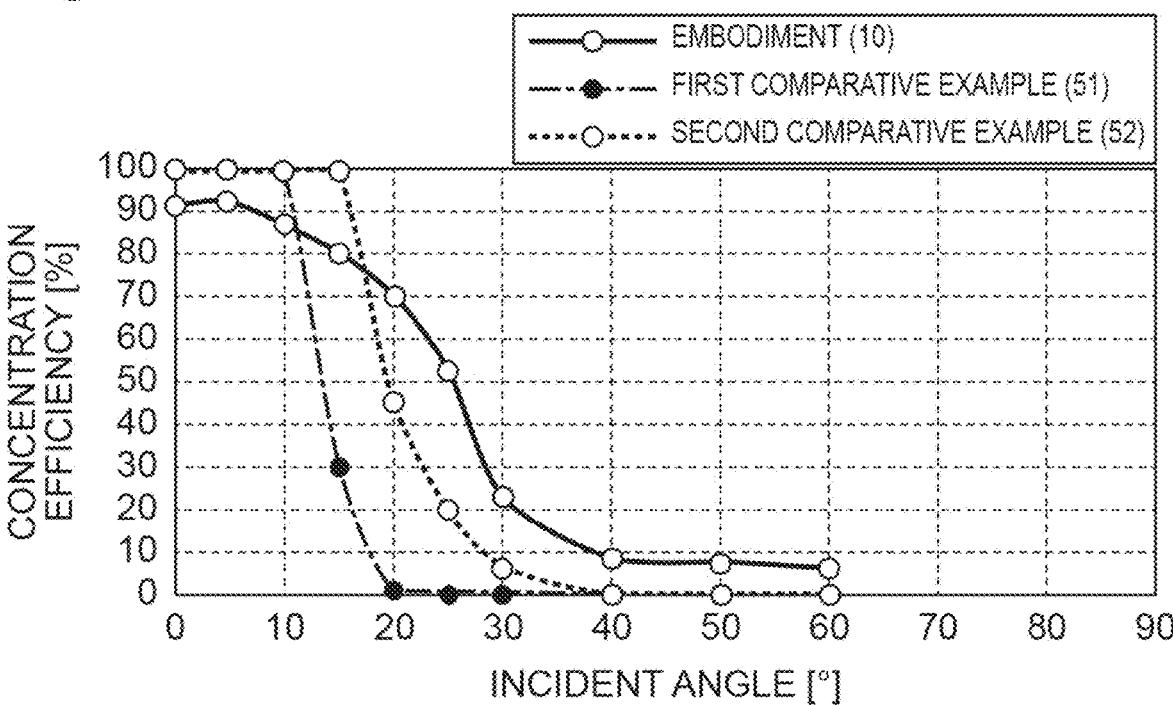
FIGS. 7A and 7B are graphs illustrating results of the first simulation.
Figure 7B:
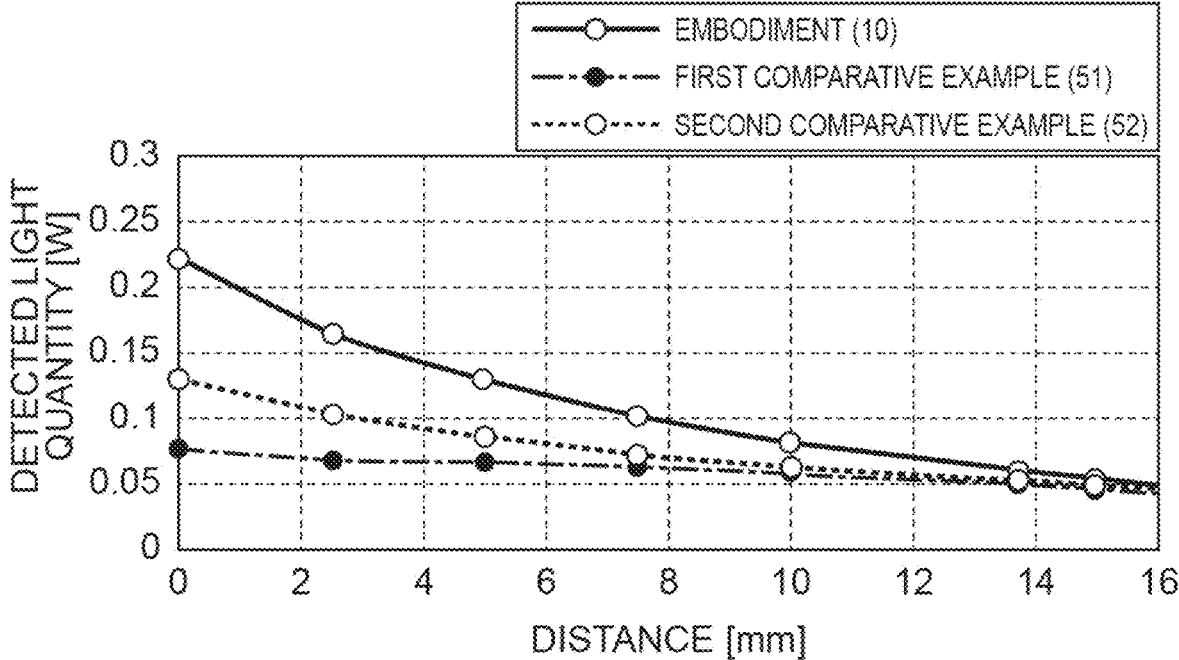

FIG. 7A illustrates a relationship between the incident angle (0) and the concentration efficiency (%) of the concentrating lens 10 of the embodiment, of the aspherical single lens 51 of the first comparative example, and of the CPC 52 of the second comparative example. FIG. 7B illustrates a relationship between the distance (mm) from a light source and the detected light quantity (W) of those lenses. The incident angle corresponds to an angle of incident light with respect to the optical axis direction D in the concentrating lens 10 described above. In the first simulation, a scattered light source having a diameter of 8 mm and a total light quantity of 1 W was used as the light source.

It can be seen from FIG. 7A that the concentrating lens 10 has a higher concentration efficiency for light having a large incident angle than the aspherical single lens 51 and the CPC 52. It can be seen from FIG. 7B that the concentrating lens 10 has a higher concentration efficiency for scattered light than the aspherical single lens 51 and the CPC 52. Therefore, the concentrating lens 10 can be suitably used for the concentration of scattered light.

Figure 8:
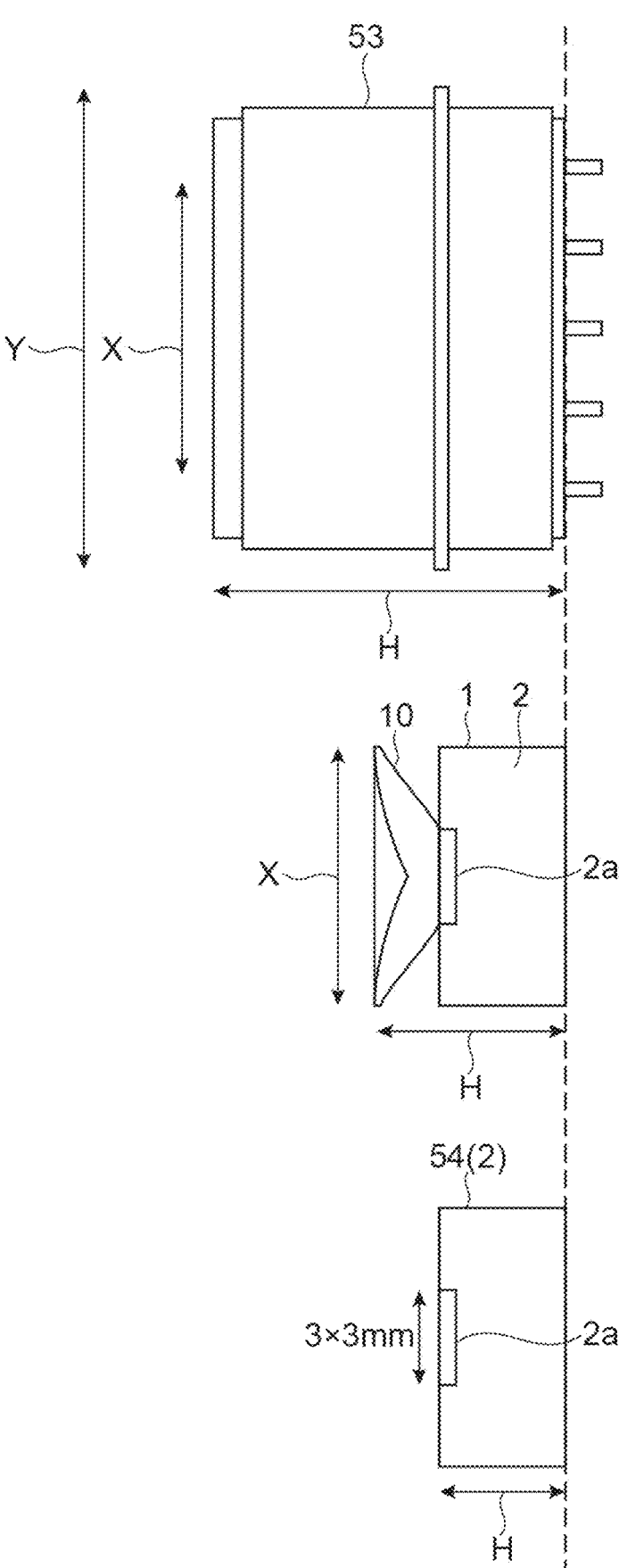
FIG. 8 is a view for describing a second simulation.

Results of a second simulation will be described with reference to FIGS. 8 and 9. In the second simulation, the photodetector 1 of the embodiment was compared to other photodetectors and was compared to the photodetector 1 (photodetection unit 2) not including the concentrating lens 10. A photodetector 53 of a third comparative example is illustrated in at a top of FIG. 8. An outer diameter Y of the photodetector 53 was 15 mm, and the incident diameter X (effective diameter of a photoelectric surface) was 8 mm. A length H of the photodetector 53 in the optical axis direction was 11 mm. The photodetector 1 is illustrated at a center of FIG. 8. A photodetector 54 of a fourth comparative example corresponding to the photodetector 1 (photodetection unit 2) not including the concentrating lens 10 is illustrated at a bottom of FIG. 8. The incident diameter X of the photodetector 1 was 8 mm, and the length H of the photodetector 1 in the optical axis direction was 6 mm. An incident surface of the photodetector 54 was the same as the light-receiving surface 2a of the photodetection unit 2, and was a square surface having a size of 3 mm×3 mm. The length H of the photodetector 54 in the optical axis direction was 4 mm. Incidentally, the photodetector 53 includes an electron multiplier unit disposed to perform electron multiplication in a direction along the optical axis direction, whereas the photodetector 54 includes, for example, an electron multiplier unit disposed to perform electron multiplication in a direction perpendicular to the optical axis direction as disclosed in European Patent No. 2557589. For this reason, the photodetector 53 has a tubular outer shape, whereas the photodetector 54 has a flat plate-shaped (flat rectangular parallelepiped) outer shape of which the size in a height direction is suppressed. For this reason, the photodetector 1 in which the concentrating lens 10 and the photodetector 54 are combined together has the sufficiently small length H (namely, height) in the optical axis direction when compared to the photodetector 53, while having the same incident diameter X as that of the photodetector 53. Namely, when the concentrating lens 10 and the photodetector 54 are combined together, the photodetector 1 can be a photodetector having a very small height even though a photomultiplier tube is used.

Figure 9:
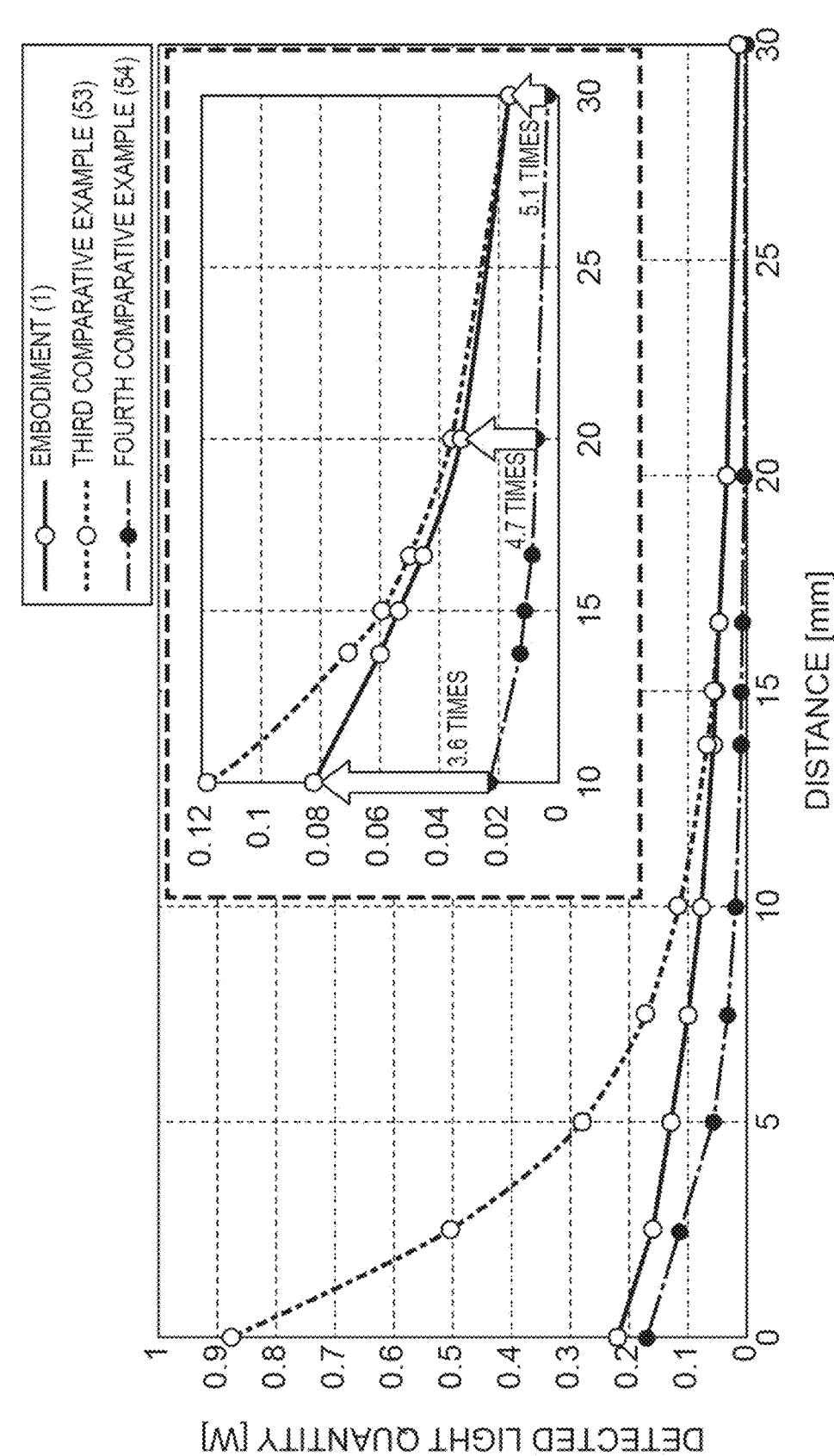
FIG. 9 is a graph illustrating results of the second simulation.

FIG. 9 illustrates a relationship between the distance from a light source and the detected light quantity of the photodetector 1 of the embodiment, of the photodetector 53 of the third comparative example, and of the photodetector 54 of the fourth comparative example. A part of the graph is illustrated inside a dotted line in an enlarged manner. In the second simulation, a scattered light source having a diameter of 8 mm and a total light quantity of 1 W was used as the light source.

It can be seen from FIG. 9 that when the photodetector 1 of the embodiment and the photodetector 53 of the third comparative example having the photoelectric surface of the same size as that of the photoelectric surface of the concentrating lens 10 of the photodetector 1 are compared, a detected light quantity of the photodetector 1 is smaller than a detected light quantity of the photodetector 53 when the distance from the light source is short, but a detected light quantity of the photodetector 1 gradually approaches a detected light quantity of the photodetector 53 as the distance from the light source increases. In addition, it can be seen that when the photodetector 1 and the photodetector 54 of the fourth comparative example not including the concentrating lens 10 are compared, a detected light quantity of the photodetector 1 is larger than a detected light quantity of the photodetector 54.

Figure 10:
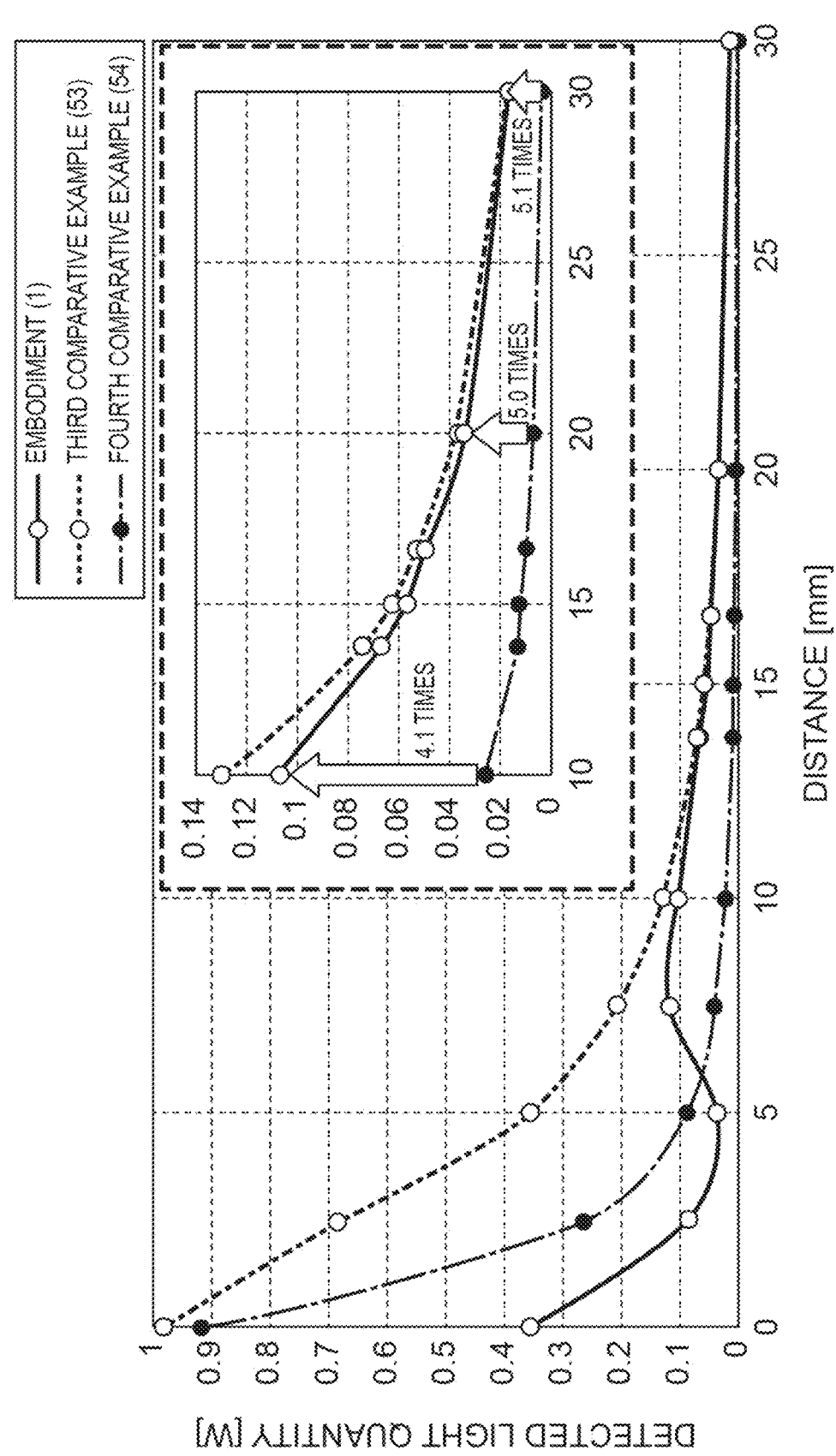
FIG. 10 is a graph illustrating results of a third simulation.

Results of a third simulation will be described with reference to FIG. 10. In the third simulation, a point light source having a total light quantity of 1 W was used as the light source. The other points were the same as in the second simulation. It can be seen from FIG. 10 that when the photodetector 1 and the photodetector 53 are compared, a detected light quantity of the photodetector 1 is smaller than a detected light quantity of the photodetector 53 when the distance from the light source is short, but a detected light quantity of the photodetector 1 gradually approaches a detected light quantity of the photodetector 53 as the distance from the light source increases. In addition, it can be seen that when the photodetector 1 and the photodetector 54 are compared, a detected light quantity of the photodetector 1 is smaller than a detected light quantity of the photodetector 54 when the distance from the light source is short, but a detected light quantity of the photodetector 1 is larger than a detected light quantity of the photodetector 54 in a region where the distance from the light source is greater than 6 mm.

Figure 11:
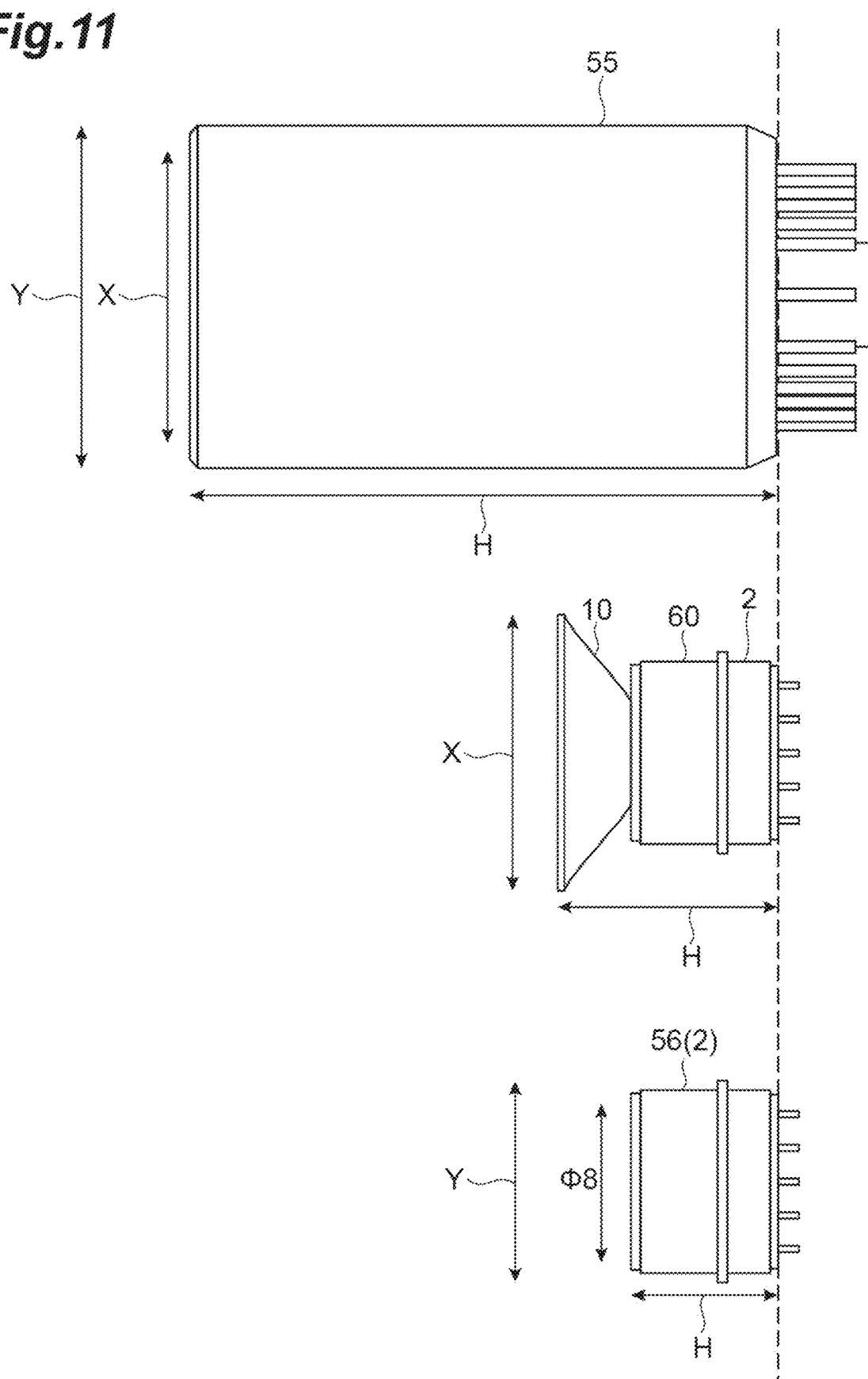
FIG. 11 is a view for describing a fourth simulation.

Results of a fourth simulation will be described with reference to FIGS. 11 and 12. In the fourth simulation, a case where the concentrating lens 10 was attached to a photodetector corresponding to the photodetector 53 described above and a case where the concentrating lens was not attached thereto were compared. A photodetector 55 of a fifth comparative example is illustrated at a top of FIG. 11. The outer diameter Y of the photodetector 55 was 25 mm, and the incident diameter X (effective diameter of a photoelectric surface) was 22 mm. The length H of the photodetector 55 in the optical axis direction was 44 mm. A photodetector 60 of an embodiment of the present disclosure is illustrated at a center of FIG. 11. The photodetector 60 includes the photodetection unit 2 and the concentrating lens 10. A photodetector 56 of a sixth comparative example corresponding to the photodetector 60 (photodetection unit 2) not including the concentrating lens 10 is illustrated at a bottom of FIG. 11. The incident diameter X of the photodetector 60 was 21 mm, and the length H of the photodetector 60 in the optical axis direction was 16 mm. The outer diameter Y of the photodetector 56 was 15 mm. An incident surface of the photodetector 56 was the same as the light-receiving surface 2a of the photodetection unit 2 of the photodetector 60, and was a circular surface having a diameter of 8 mm. The length H of the photodetector 56 in the optical axis direction was 11 mm.

Figure 12:
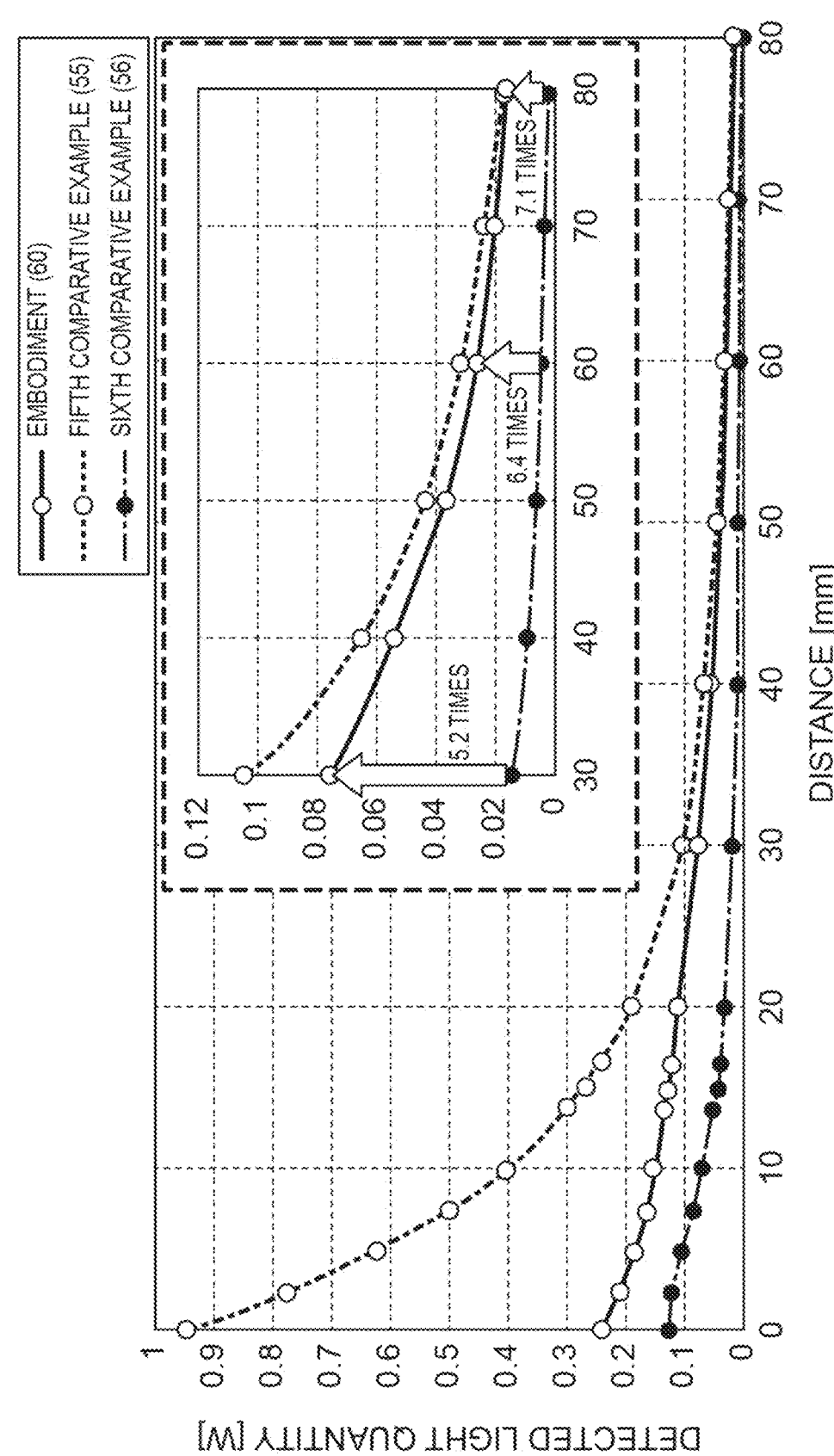
FIG. 12 is a graph illustrating results of the fourth simulation.

FIG. 12 illustrates a relationship between the distance from a light source and the detected light quantity of the photodetector 60 of the embodiment, of the photodetector 55 of the fifth comparative example, and of the photodetector 56 of the sixth comparative example. A part of the graph is illustrated inside a dotted line in an enlarged manner. In the fourth simulation, a scattered light source having a diameter of 22 mm and a total light quantity of 1 W was used as the light source.

It can be seen from FIG. 12 that when the photodetector 60 and the photodetector 55 having the photoelectric surface of substantially the same size as that of the photoelectric surface of the concentrating lens 10 of the photodetector 60 are compared, a detected light quantity of the photodetector 60 is smaller than a detected light quantity of the photodetector 55 when the distance from the light source is short, but a detected light quantity of the photodetector 60 gradually approaches a detected light quantity of the photodetector 55 as the distance from the light source increases. In addition, it can be seen that when the photodetector 60 and the photodetector 56 not including the concentrating lens 10 are compared, a detected light quantity of the photodetector 60 is larger than a detected light quantity of the photodetector 56.

Figure 13A:
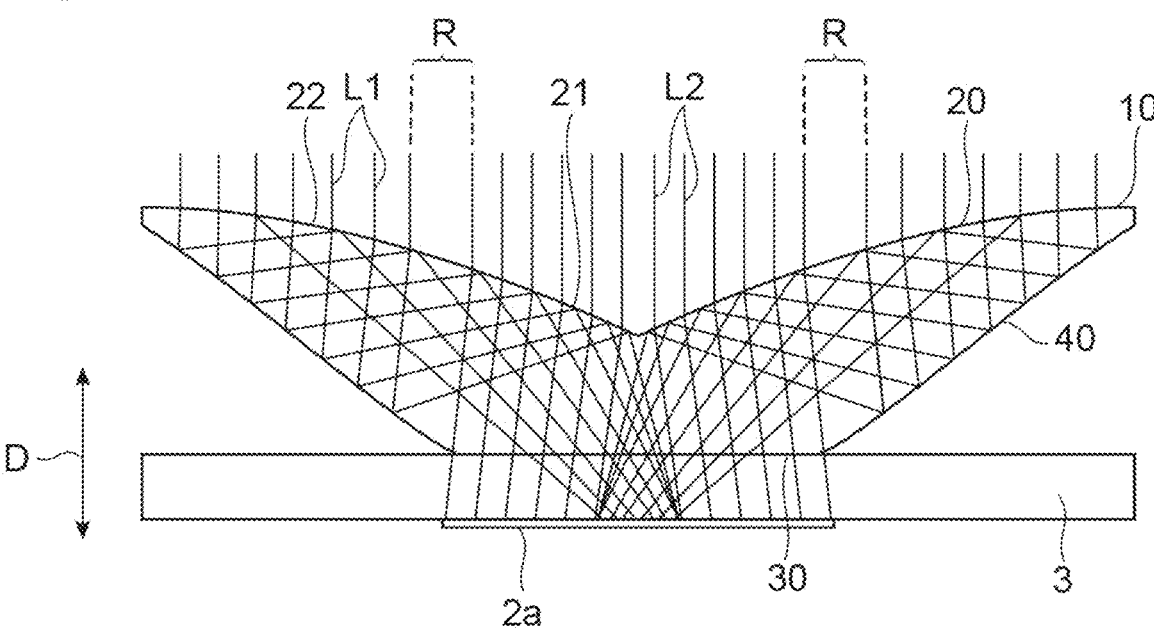
FIG. 13A is a view illustrating the concentrating lens of the embodiment.
Figure 13B:
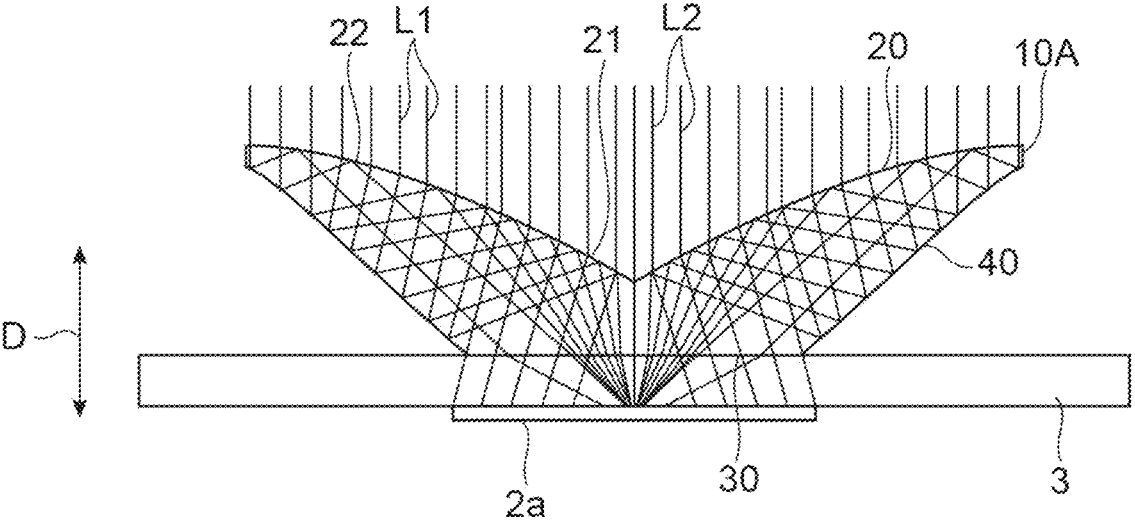
FIG. 13B is a view illustrating a concentrating lens of a first modification example.

FIG. 13A is a view illustrating the concentrating lens 10 of the embodiment, and FIG. 13B is a view illustrating a concentrating lens 10A of a first modification example. As illustrated in FIG. 13A, when a region on the incident surface 20 is defined as a non-effective region R, light incident on the region in parallel to the optical axis direction D not being incident on the emitting surface 30, the incident surface 20 of the concentrating lens 10 includes the non-effective region R. Specifically, the non-effective region R exists at a boundary part between the central portion 21 and the outer portion 22 of the incident surface 20. On the other hand, the concentrating lens 10A of the first modification example does not include the non-effective region R. Namely, in the concentrating lens 10A, the entirety of the incident surface 20 is an effective region, and light incident on the incident surface 20 is incident on the emitting surface 30 regardless of the position of incidence on the incident surface 20. In addition, in the concentrating lens 10A, the shape is changed so that a concentration spot on the light-receiving surface 2a is changed to be closer to a point than that of the concentrating lens 10. In addition, the material is changed to a glass material having a higher refractive index to favor such a design.

Figure 14:
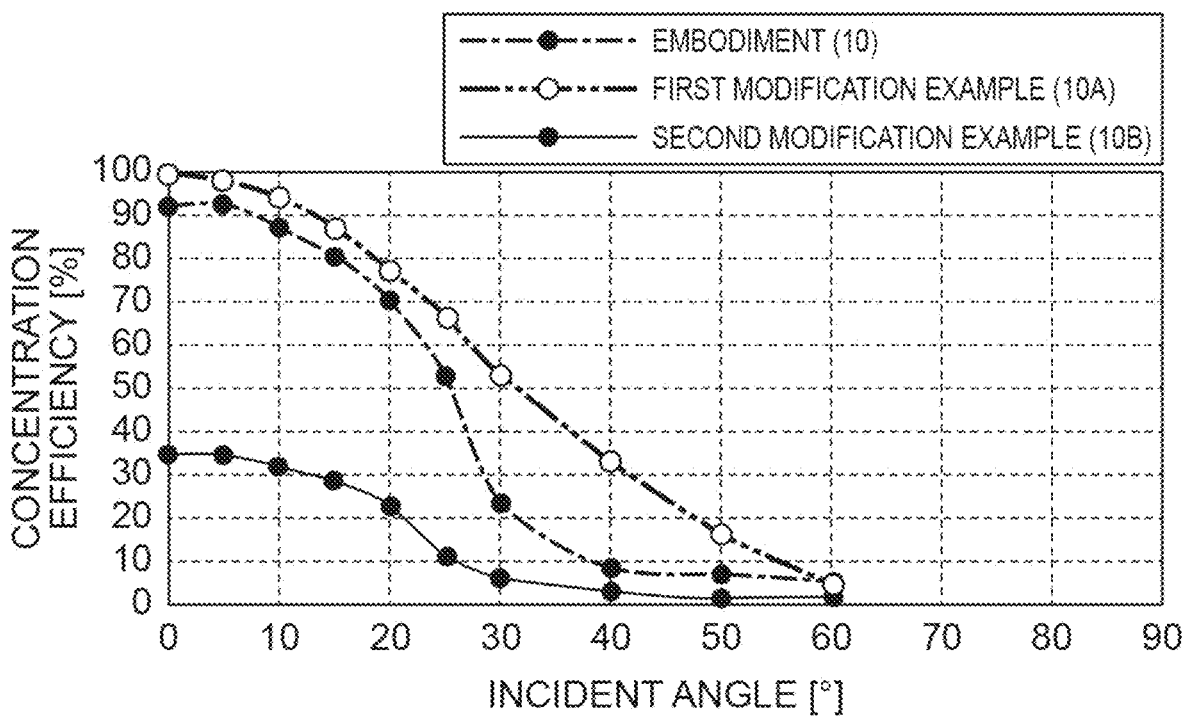
FIG. 14 is a graph illustrating results of a fifth simulation.

FIG. 14 is a graph illustrating results of a fifth simulation. FIG. 14 illustrates a relationship between the incident angle and the concentration efficiency of the concentrating lens 10 of the embodiment and of the concentrating lens 10A of the first modification example. It can be seen from FIG. 14 that the concentrating lens 10A not including the non-effective region R has a higher concentration efficiency than the concentrating lens 10 including the non-effective region R.

As described above, the concentrating lens 10A of the first modification example is advantageous from the viewpoint of improving the concentration efficiency. In addition, the concentrating lens 10A is advantageous from the viewpoint of achieving a reduction in size by narrowing the incident surface 20. On the other hand, since the incident surface 20 includes the non-effective region R, the concentrating lens 10 of the embodiment is advantageous in that the incident surface 20 can be widened. In addition, the non-effective region R may be set in consideration of the shape of incident light or a region on which concentration wants to be performed. The size of the non-effective region R can be set in consideration of these points. For example, the non-effective region R may be set on the incident surface 20 such that a concentration efficiency of the concentrating lens 10 for light parallel to the optical axis direction D is 50% or more. As illustrated in FIG. 14, in the embodiment, a concentration efficiency of the concentrating lens 10 for light parallel to the optical axis direction D (namely, concentration efficiency when the incident angle is 0°) is higher than 90%. Alternatively, the non-effective region R may be set on the incident surface 20 such that an area of the non-effective region R is 50% or less of an entire area of the incident surface 20.

Figure 15A:
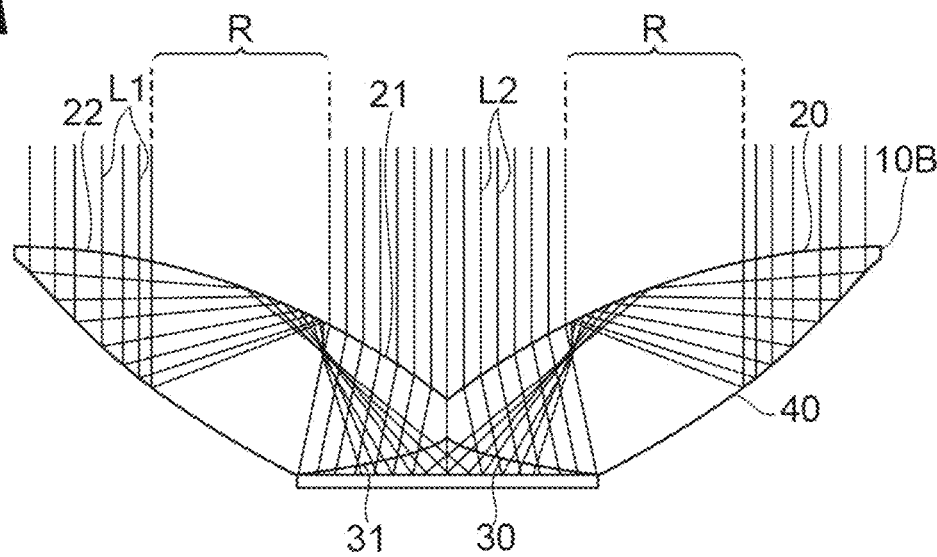
FIGS. 15A, 15B, and 15C are views for describing a second modification example.
Figure 15B:
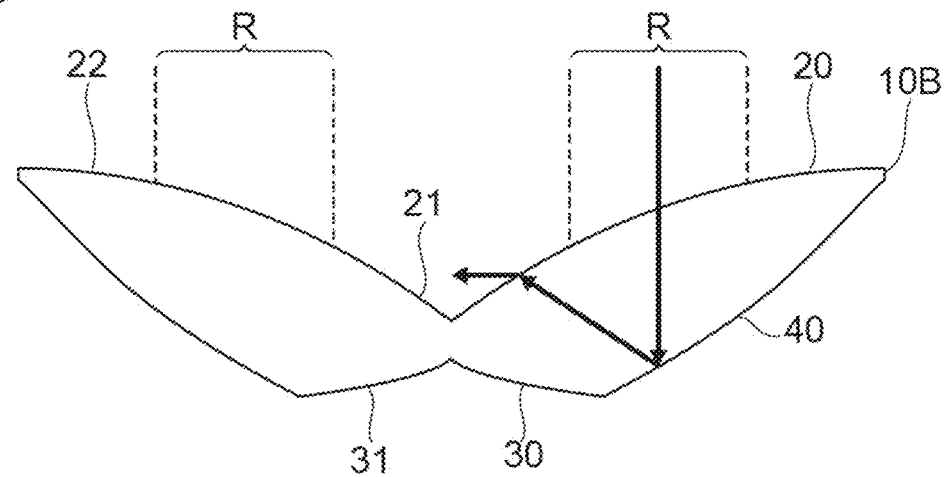
Figure 15C:
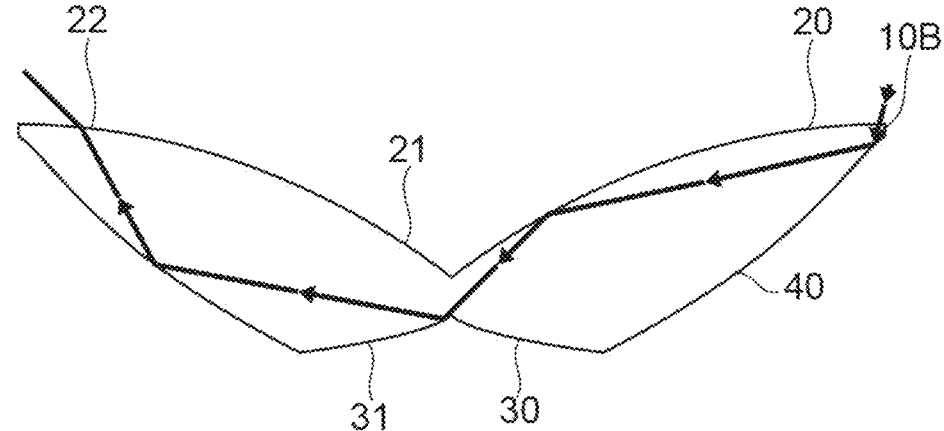

FIGS. 15A, 15B, and 15C are views illustrating a concentrating lens 10B of a second modification example. In the concentrating lens 10B, the non-effective region R is set to be wider than that of the concentrating lens 10 of the embodiment. In the concentrating lens 10B, the emitting surface 30 is formed by an inner surface of a depression portion 31 having a substantially conical shape recessed toward a center of the emitting surface 30. The inside of the depression portion 31 is a void (air layer).

FIG. 14 described above also illustrates a relationship between the incident angle and the concentration efficiency of the concentrating lens 10B of the second modification example. It can be seen from FIG. 14 that a concentration efficiency of the concentrating lens 10B in which the non-effective region R is wide is lower than a concentration efficiency of the concentrating lens 10 in which the non-effective region R is narrow and of the concentrating lens 10A not including the non-effective region R. As illustrated in FIG. 15B, the reason is considered to be that in the concentrating lens 10B, light which has been incident on the non-effective region R, reflected by the reflective surface 40, and incident on the incident surface 20 transmits through the incident surface 20 instead of being totally reflected by the incident surface 20. In addition, as illustrated in FIG. 15C, another reason is considered to be that since the inside of the depression portion 31 forming the emitting surface 30 is an air layer, light incident on the emitting surface 30 is totally reflected by the emitting surface 30. Namely, in the concentrating lens 10 of the embodiment and the concentrating lens 10A of the first modification example, since the first light L1 that has been reflected by the reflective surface 40 and incident on the incident surface 20 is totally reflected in a wide range of the incident surface 20 and is incident on the emitting surface 30, the concentration efficiency is improved. In addition, the concentration efficiency is also improved since the emitting surface 30 is a flat surface perpendicular to the optical axis direction D and an air layer is not formed between the emitting surface 30 and the window member 3.

Figure 16A:
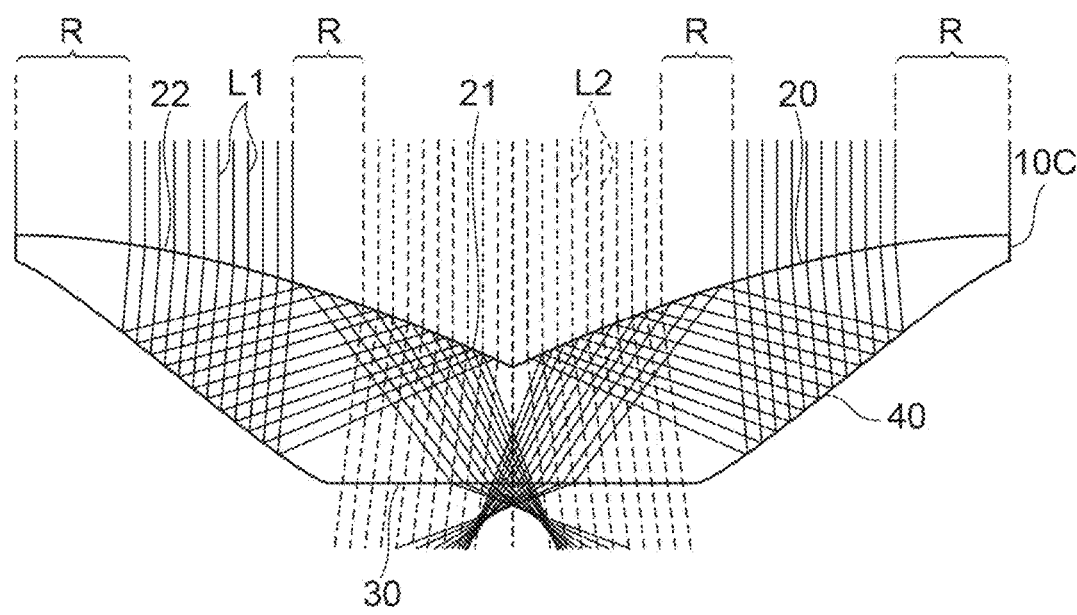
FIGS. 16A and 16B are views illustrating a concentrating lens of a third modification example.
Figure 16B:
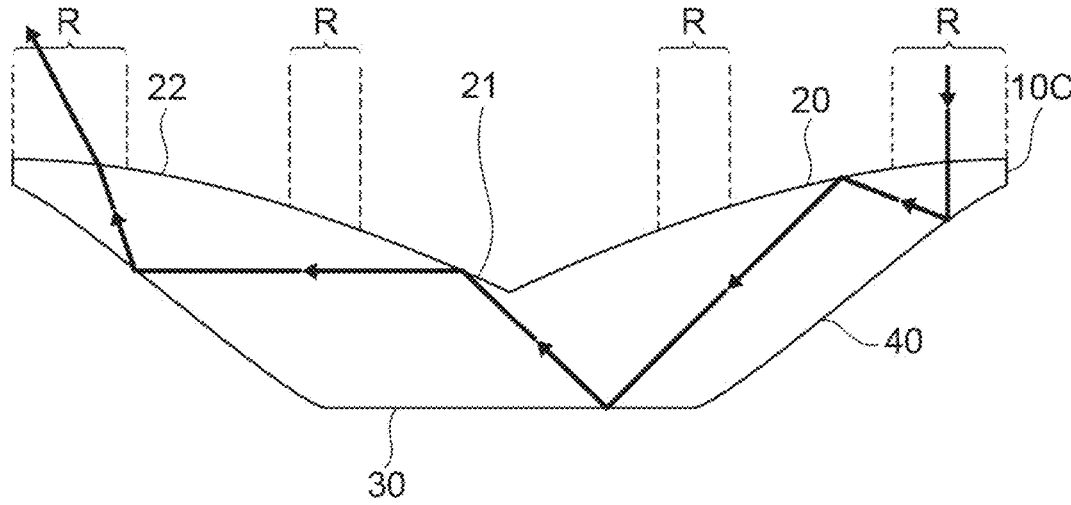
Figure 18A:
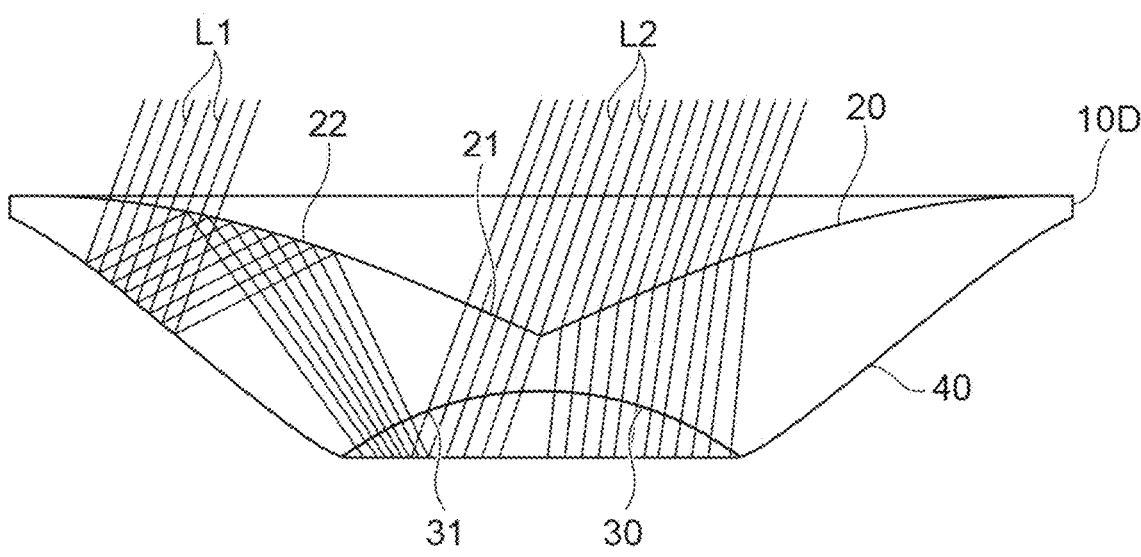
FIGS. 18A and 18B are views illustrating the concentrating lens of the fourth modification example.
Figure 18B:
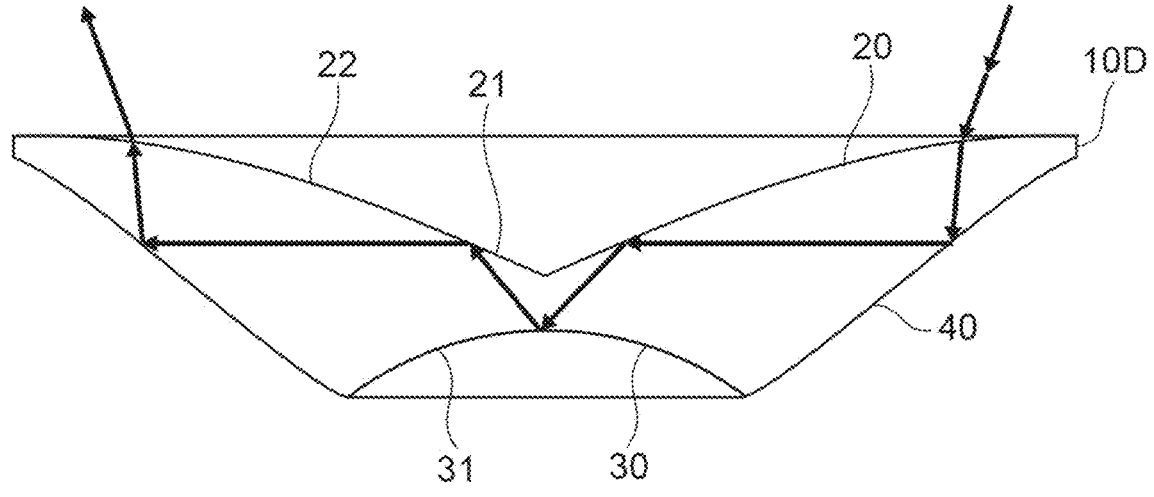
Figure 19:
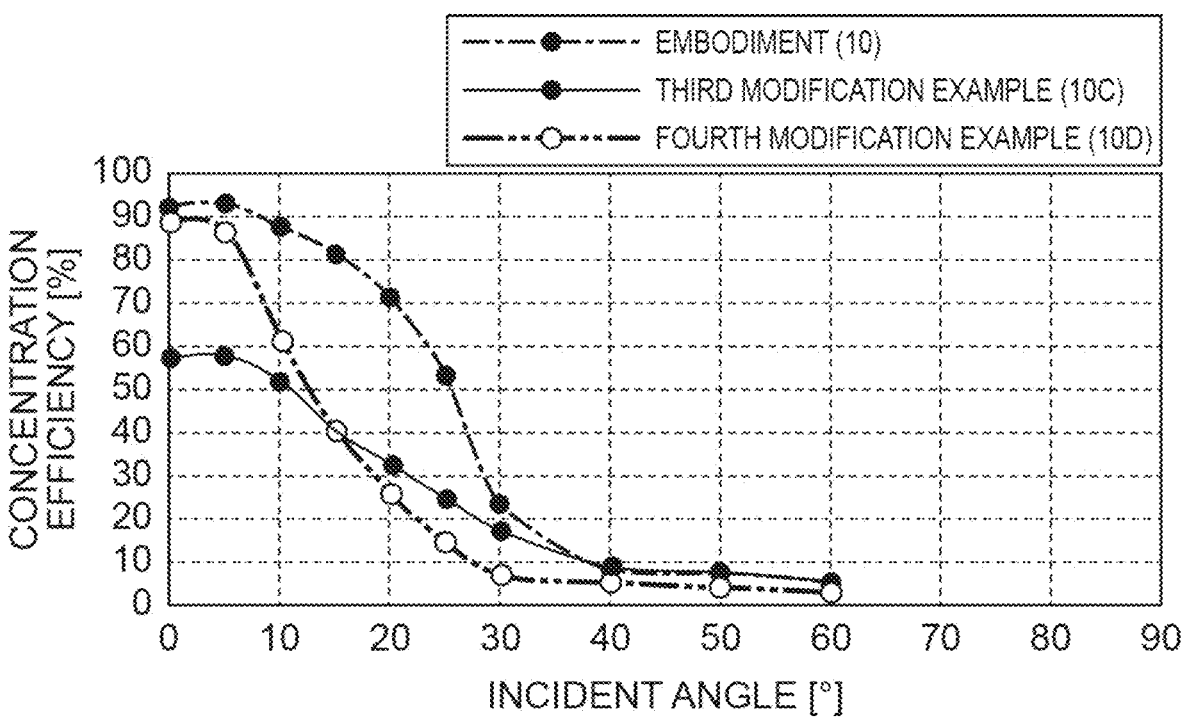
FIG. 19 is a graph illustrating results of a sixth simulation.

Results of a sixth simulation will be described with reference to FIGS. 16A to 18B. In the sixth simulation, the concentrating lens 10 of the embodiment was compared to a concentrating lens 10C of a third modification example and to a concentrating lens 10D of a fourth modification example. In the concentrating lens 10 of the embodiment, the optical coupling agent 5 is disposed on the emitting surface 30, whereas in the concentrating lens 10C of the third modification example illustrated in FIG. 16A, the optical coupling agent 5 is not disposed on the emitting surface 30. Incidentally, in the simulation illustrated in FIG. 16A, since the window member 3 is omitted and an air layer is provided, the optical coupling agent 5 is not disposed. In the concentrating lens 10C, the non-effective region R exists at the outer edge portion of the incident surface 20. As illustrated in FIG. 16B, the reason is considered to be that light which has been incident on the outer edge portion of the incident surface 20 and reached the emitting surface 30 is totally reflected by the emitting surface 30. FIG. 19 illustrates a relationship between the incident angle and the concentration efficiency of the concentrating lens of the embodiment and of the concentrating lens 10C of the third modification example. It can be seen from FIG. 19 that a concentration efficiency of the concentrating lens 10 of the embodiment is higher than a concentration efficiency of the concentrating lens 10C of the third modification example.

As described above, in the concentrating lens 10 of the embodiment, since the emitting surface 30 is connected to the light-receiving surface 2a via the optical coupling agent 5, the concentration efficiency is improved.

Figure 17:
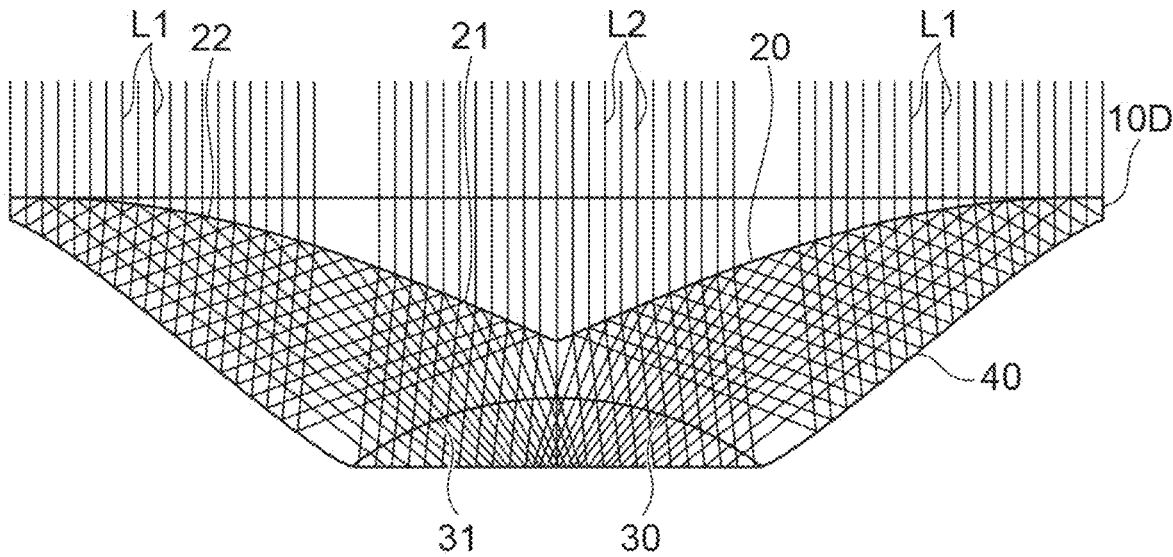
FIG. 17 is a view illustrating a concentrating lens of a fourth modification example.

As illustrated in FIG. 17, in the concentrating lens 10D of the fourth modification example, the emitting surface 30 is formed by an inner surface (rounded surface) of the depression portion 31 having a substantially hemispherical shape recessed toward the center of the emitting surface 30, and is curved to be recessed toward the center of the emitting surface 30. In this example, the emitting surface 30 is a continuous curved surface that is convex toward an incident surface 20 side. The inside of the depression portion 31 is, for example, a void (air layer). In the fourth modification example, unlike the second modification example described above, since the emitting surface 30 is curved in a round shape, the total reflection by the emitting surface 30 is suppressed. FIG. 19 also illustrates a relationship between the incident angle and the concentration efficiency of the concentrating lens 10D of the fourth modification example. It can be seen from FIG. 19 that when the incident angle is small, a concentration efficiency of the concentrating lens 10D of the fourth modification example is higher than a concentration efficiency of the concentrating lens 10C of the third modification example, but when the incident angle is large, a concentration efficiency of the concentrating lens 10D is lower than a concentration efficiency of the concentrating lens 10C. As illustrated in FIGS. 18A and 18B, the reason is considered to be that in the concentrating lens 10D, light is totally reflected by the emitting surface 30 depending on the incident angle and the non-effective region is formed on the incident surface 20.

In the concentrating lens 10D of the fourth modification example, the optical coupling agent may be disposed inside the depression portion 31 forming the emitting surface 30. In this case, the total reflection by the emitting surface 30 can be suppressed, and the concentration efficiency can be improved. However, the work of filling the inside of the depression portion 31 with the optical coupling agent such that air does not remain inside the depression portion 31 is no easy, and the workability can decrease. Namely, in the concentrating lens 10 of the embodiment, since the optical coupling agent 5 may be disposed between the emitting surface 30 that is flat and the window member 3, the workability can be improved.

Figure 20A:
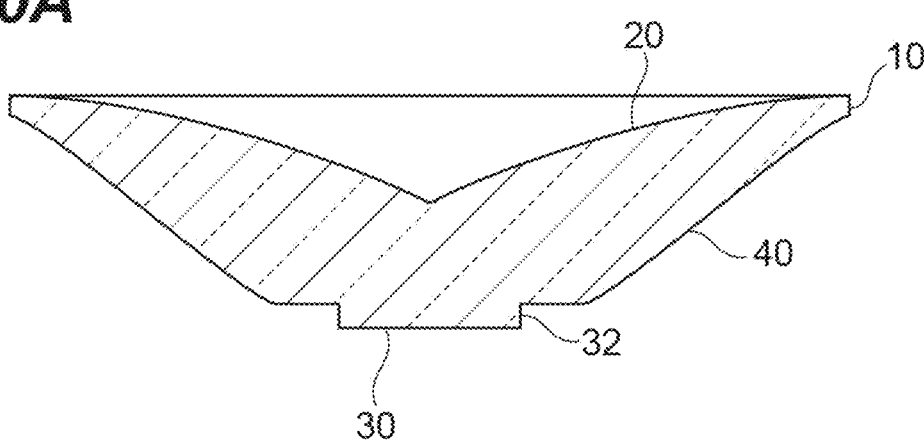
FIGS. 20A, 20B, and 20C are views for describing other modification examples.
Figure 20B:
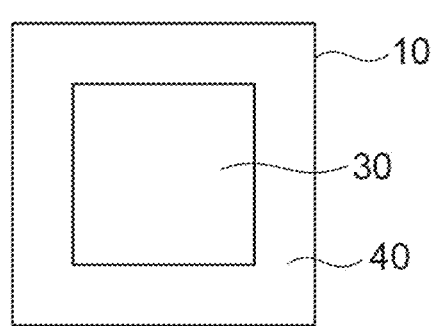
Figure 20C:
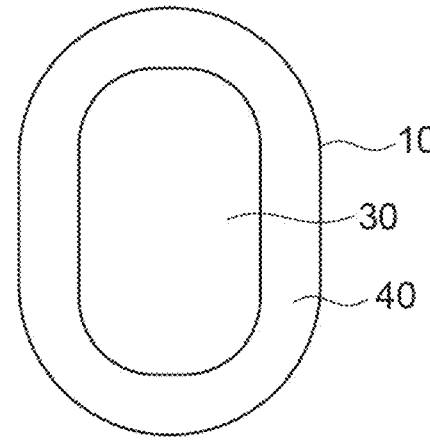

FIGS. 20A, 20B, and 20C are views for describing other modification examples. As illustrated in FIG. 20A, the emitting surface may be a surface of a protrusion portion 32 formed on the concentrating lens 10. The concentrating lens 10 may be formed in a rectangular shape as illustrated in FIG. 20B or may be formed in an elliptical shape as illustrated in FIG. 20C when viewed in the optical axis direction D. Alternatively, the concentrating lens 10 may be formed in a hexagonal shape or in an octagonal shape when viewed in the optical axis direction D.

Figure 21A:
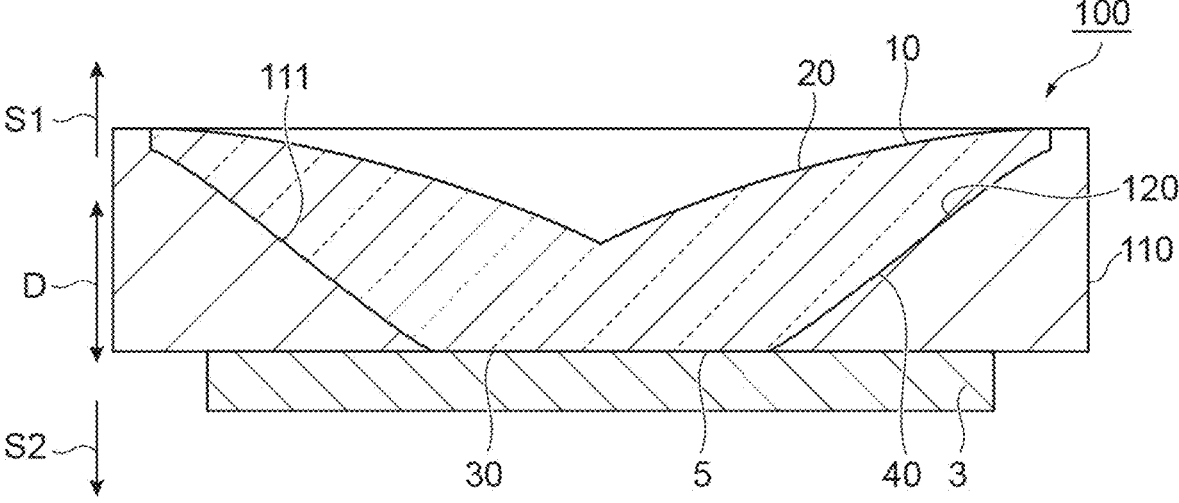
FIG. 21A is a cross-sectional view of a concentrating lens unit.
Figure 21B:
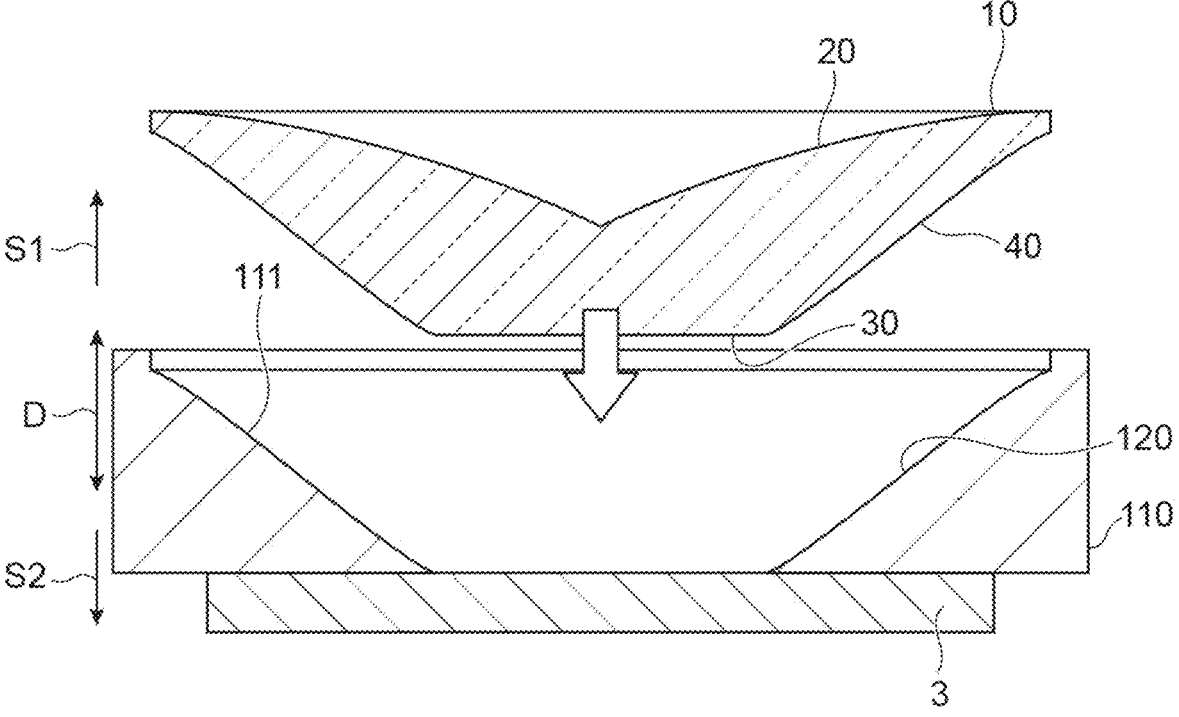
FIG. 21B is an exploded view of the concentrating lens unit.

FIGS. 21A and 21B illustrate a concentrating lens unit 100. The concentrating lens unit 100 includes the concentrating lens 10 and a reflective member 110 combined with the concentrating lens 10. In this example, the reflective layer 43 is not formed on the reflective surface 40 of the concentrating lens 10, and the reflective member 110 has a reflective surface 120 that reflects light. A disposition hole 111 having a shape corresponding to the shape of the concentrating lens 10 is formed in the reflective member 110. The disposition hole 111 is open to both the first side S1 and the second side S2 in the optical axis direction D. The concentrating lens 10 is disposed in the disposition hole 111 such that the incident surface 20 is exposed from one opening of the disposition hole 111 and the emitting surface 30 is exposed from the other opening of the disposition hole 111. Similarly to the embodiment above, the emitting surface 30 is connected to the window member 3 via the optical coupling agent 5.

An inner surface of the disposition hole 111 is the reflective surface 120. The reflective surface 120 may be formed, for example, by making the reflective member 110 from a material having light reflectivity and by performing polishing on the reflective member 110. Alternatively, for example, the reflective surface 120 may be formed by the evaporation of a reflective film made of a metal material such as aluminum. The reflective surface 120 of the reflective member 110 is disposed along the reflective surface 40 of the concentrating lens 10, so that the reflective surface 40 of the concentrating lens 10 reflects light. The reflective surface 120 of the reflective member 110 and the reflective surface 40 of the concentrating lens 10 face each other, and the reflective surface 120 and the reflective surface 40 are connected to each other via the optical coupling agent.

According to the concentrating lens unit 100, for the above-described reason, it is also possible to achieve a reduction in thickness and high efficiency. In addition, since the reflective member 110 is combined with the concentrating lens 10, the strength can be improved, and the handling or the workability such as fixing to the photodetection unit 2 can be improved when compared to the concentrating lens 10 alone. In addition, in the concentrating lens 10 of the embodiment, a reflective film needs to be evaporated only on the reflective surface 40 of the concentrating lens 10 using, for example, masking or the like, whereas in the concentrating lens unit 100, a reflective film may be evaporated on an inner surface of the disposition hole 111, so that an evaporation process can be facilitated, and the workability can be improved.

The present disclosure is not limited to the embodiment above and to the modification examples. Characteristics and aspects of the embodiment and the modification examples of the present disclosure can not only be the above-described specific combinations but also combined with each other as appropriate. For example, the concentrating lens unit 100 may include any one of the concentrating lenses 10A to 10D of the first to fourth modification examples instead of the concentrating lens 10 of the embodiment. The material and the shape of each configuration are not limited to the materials and the shapes described above, and various materials and shapes can be adopted. The shape of the concentrating lens 10 can be changed in accordance with the material of the concentrating lens.

The concentrating lens 10 may include a flange portion extending from the incident surface 20 to the outside when viewed in the optical axis direction D. The flange portion may be formed in an annular shape or may be only partially formed in the circumferential direction. The window member 3 may be omitted. The concentrating lens 10 may be disposed such that the emitting surface 30 faces the light-receiving surface 2a of the photodetection unit 2, and the emitting surface 30 may be disposed on the light-receiving surface 2a without the window member 3 interposed therebetween.

What is claimed is:

1. A concentrating lens that concentrates light incident along an optical axis direction and emits the light, the lens comprising:

an incident surface that is a surface on a first side in the optical axis direction; and

US 12,687,710 B2

15 an emitting surface and a reflective surface that are surfaces on a second side in the optical axis direction, wherein the incident surface includes a central portion and an outer portion surrounding the central portion when viewed in the optical axis direction, the incident surface is formed by an inner surface of a depression portion recessed toward a center of the central portion, the reflective surface surrounds the emitting surface when viewed in the optical axis direction, the reflective surface extends so as to go toward the first side as going toward an outside, a first light incident on the outer portion of the incident surface transmits through the outer portion, is reflected by the reflective surface, reflected by the incident surface, and incident on the emitting surface, a second light incident on the central portion of the incident surface transmits through the central portion and is incident on the emitting surface, and the central portion reflects the first light reflected by the reflective surface, toward the emitting surface and transmits the second light.

2. The concentrating lens according to claim 1, wherein the emitting surface is a flat surface perpendicular to the optical axis direction.

3. The concentrating lens according to claim 1, wherein the emitting surface is formed by an inner surface of a depression portion recessed toward a center of the emitting surface.

4. The concentrating lens according to claim 3, wherein the emitting surface is curved to be recessed toward the center of the emitting surface.

5. The concentrating lens according to claim 1, wherein when a region on the incident surface is defined as a non-effective region, light incident on the region in parallel to the optical axis direction not being incident on the emitting surface, the non-effective region is set on the incident surface such that a concentration efficiency of the concentrating lens for the light parallel to the optical axis direction is 50% or more.

6. The concentrating lens according to claim 1, wherein when a region on the incident surface is defined as a non-effective region, light incident on the region in parallel to the optical axis direction not being incident on the emitting surface, the non-effective region is set on the incident surface such that an area of the non-effective region is 50% or less of an entire area of the incident surface.

7. The concentrating lens according to claim 1, wherein when a region on the incident surface is defined as a non-effective region, light incident on the region in parallel to the optical axis direction not being incident on the emitting surface, the incident surface does not include the non-effective region.

8. The concentrating lens according to claim 1, wherein in a cross section perpendicular to the optical axis direction, the incident surface includes a pair of parts facing each other, and each of the pair of parts is curved to swell toward the first side.

9. The concentrating lens according to claim 1, wherein in a cross section perpendicular to the optical axis direction, the reflective surface includes a first part and a second part located on the first side with respect to the first part, the first part is curved to swell toward the second side, and the second part is curved to be recessed toward the first side.

10. The concentrating lens according to claim 1, wherein a reflective layer is formed on the reflective surface, so that the reflective surface reflects the light.

11. The concentrating lens according to claim 1, wherein an anti-reflection layer is formed on the incident surface, so that the incident surface prevents the light from being reflected.

12. A photodetector with a concentrating lens comprising:

a photodetection unit having a light-receiving surface; and the concentrating lens according to claim 1 in which the emitting surface is disposed to face the light-receiving surface.

13. The photodetector with a concentrating lens according to claim 12, wherein the emitting surface and the light-receiving surface are connected to each other via an optical coupling agent.

14. A concentrating lens unit comprising:

the concentrating lens according to claim 1; and a reflective member combined with the concentrating lens, wherein the reflective member has a reflective surface that reflects light, and the reflective surface of the reflective member is disposed along the reflective surface of the concentrating lens, so that the reflective surface of the concentrating lens reflects the light.

15. A concentrating lens that concentrates light incident along an optical axis direction and emits the light, the lens comprising:

an incident surface that is a surface on a first side in the optical axis direction; and an emitting surface and a reflective surface that are surfaces on a second side in the optical axis direction, wherein the incident surface includes a central portion and an outer portion surrounding the central portion when viewed in the optical axis direction, the incident surface is formed by an inner surface of a depression portion recessed toward a center of the central portion, the reflective surface surrounds the emitting surface when viewed in the optical axis direction, the reflective surface extends so as to go toward the first side as going toward an outside, a first light incident on the outer portion of the incident surface transmits through the outer portion, is reflected by the reflective surface, reflected by the incident surface, and incident on the emitting surface, a second light incident on the central portion of the incident surface transmits through the central portion and is incident on the emitting surface, the central portion reflects the first light reflected by the reflective surface, toward the emitting surface and transmits the second light, and wherein when a region on the incident surface is defined as a non-effective region, light incident on the region in parallel to the optical axis direction not being incident on the emitting surface, the non-effective region is set on the incident surface such that a concentration efficiency of the concentrating lens for the light parallel to the optical axis direction is 50% or more.

16. A concentrating lens that concentrates light incident along an optical axis direction and emits the light, the lens comprising:

an incident surface that is a surface on a first side in the optical axis direction; and an emitting surface and a reflective surface that are surfaces on a second side in the optical axis direction, wherein the incident surface includes a central portion and an outer portion surrounding the central portion when viewed in the optical axis direction, the incident surface is formed by an inner surface of a depression portion recessed toward a center of the central portion, the reflective surface surrounds the emitting surface when viewed in the optical axis direction, the reflective surface extends so as to go toward the first side as going toward an outside, a first light incident on the outer portion of the incident surface transmits through the outer portion, is reflected by the reflective surface, reflected by the incident surface, and incident on the emitting surface, a second light incident on the central portion of the incident surface transmits through the central portion and is incident on the emitting surface, the central portion reflects the first light reflected by the reflective surface, toward the emitting surface and transmits the second light, and when a region on the incident surface is defined as a non-effective region, light incident on the region in parallel to the optical axis direction not being incident on the emitting surface, the non-effective region is set on the incident surface such that an area of the non-effective region is 50% or less of an entire area of the incident surface.

17. A concentrating lens that concentrates light incident along an optical axis direction and emits the light, the lens comprising:

an incident surface that is a surface on a first side in the optical axis direction; and an emitting surface and a reflective surface that are surfaces on a second side in the optical axis direction, wherein the incident surface includes a central portion and an outer portion surrounding the central portion when viewed in the optical axis direction, the incident surface is formed by an inner surface of a depression portion recessed toward a center of the central portion, the reflective surface surrounds the emitting surface when viewed in the optical axis direction, the reflective surface extends so as to go toward the first side as going toward an outside, a first light incident on the outer portion of the incident surface transmits through the outer portion, is reflected by the reflective surface, reflected by the incident surface, and incident on the emitting surface, a second light incident on the central portion of the incident surface transmits through the central portion and is incident on the emitting surface, the central portion reflects the first light reflected by the reflective surface, toward the emitting surface and transmits the second light, and when a region on the incident surface is defined as a non-effective region, light incident on the region in parallel to the optical axis direction not being incident on the emitting surface, the incident surface does not include the non-effective region.

18. The concentrating lens according to claim 1, wherein an edge is formed between the reflective surface and the emitting surface.

* * * * *